United States Patent
Helms, Jr. et al.

(10) Patent No.: US 7,789,919 B2
(45) Date of Patent: Sep. 7, 2010

(54) COMBUSTIBLE PACKAGES FOR CONTAINING A FUEL SOURCE AND A FIRE STARTER

(75) Inventors: Charles F. Helms, Jr., Florence, SC (US); William Ernest Stogner, Hartsville, SC (US); John David Barfield, Patrick, SC (US); Bruce Arthur Moon, Hartsville, SC (US); William David Decker, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 79 days.

(21) Appl. No.: 11/686,150

(22) Filed: Mar. 14, 2007

(65) Prior Publication Data
US 2008/0092437 A1    Apr. 24, 2008

Related U.S. Application Data

(60) Provisional application No. 60/862,140, filed on Oct. 19, 2006, provisional application No. 60/894,122, filed on Mar. 9, 2007, now abandoned.

(51) Int. Cl.
*C10L 11/00* (2006.01)
*C10L 11/06* (2006.01)

(52) U.S. Cl. .............. 44/530; 44/532; 44/533; 44/534; 44/541

(58) Field of Classification Search .......... 44/520, 44/530, 532, 533, 534, 541
See application file for complete search history.

(56) References Cited

U.S. PATENT DOCUMENTS

| 1,959,743 A | 5/1934 | Heron |
| 2,834,661 A | 5/1958 | Chaplin |
| 3,031,277 A | 4/1962 | Strauss |

(Continued)

FOREIGN PATENT DOCUMENTS

EP    1 547 500    6/2005

(Continued)

OTHER PUBLICATIONS

International Search Report for International Application No. PCT/US2007/081900.

(Continued)

*Primary Examiner*—Ellen M McAvoy
*Assistant Examiner*—Pamela Weiss
(74) *Attorney, Agent, or Firm*—Alston & Bird LLP

(57) ABSTRACT

Combustible packages for containing a fuel source and a fire started are provided. A combustible package may include a cardboard outer wall and top and bottom lids for substantially closing top and bottom openings defined by the outer wall. Each lid may define a central panel for extending across an opening and a plurality of tabs for facilitating a press fit between the lids and the outer wall. Each lid may also define a central opening for receiving an end of a fire starter. The fire starter may be wound paper tube impregnated with an accelerant. The fuel source may be a plurality of charcoal briquettes contained between the outer wall, the top and bottom lids and the fire starter. The outer wall may define one or more ventilation openings between the bottom edge and the bottom lid. Or the bottom edge may be scalloped to provide ventilation openings.

27 Claims, 35 Drawing Sheets

U.S. PATENT DOCUMENTS

| | | | |
|---|---|---|---|
| 3,034,873 A | 5/1962 | Weir | |
| 3,056,665 A | 10/1962 | Linda et al. | |
| 3,124,432 A | 3/1964 | Gentry | |
| 3,269,807 A | 8/1966 | Key, Jr. | |
| 4,102,317 A * | 7/1978 | Shonnard et al. | 44/522 |
| 4,177,917 A * | 12/1979 | Webinger | 229/125.19 |
| 4,386,937 A * | 6/1983 | Fareri et al. | 44/544 |
| 4,460,377 A * | 7/1984 | Kalil | 44/520 |
| 4,786,290 A * | 11/1988 | Wyer | 44/519 |
| 4,832,703 A | 5/1989 | Campana et al. | |
| 4,906,254 A | 3/1990 | Antosko | |
| 4,953,533 A * | 9/1990 | Witt | 126/25 B |
| 4,958,618 A * | 9/1990 | Davidson | 126/9 B |
| 5,186,721 A | 2/1993 | Campana | |
| 5,374,289 A | 12/1994 | Campana | |
| 6,328,028 B1 | 12/2001 | Cayse et al. | |
| 6,790,244 B2 | 9/2004 | Saunders et al. | |
| 2003/0079400 A1 | 5/2003 | Weissman et al. | |
| 2005/0178052 A1 * | 8/2005 | Saunders et al. | 44/550 |
| 2006/0156621 A1 | 7/2006 | Kraus et al. | |

FOREIGN PATENT DOCUMENTS

| | | |
|---|---|---|
| GB | 2 091 290 | 7/1982 |
| GB | 2 150 594 | 7/1985 |
| GB | 2 223 569 | 4/1990 |
| GB | 2 369 371 | 5/2002 |
| WO | WO 03/080770 | 10/2003 |
| WO | WO 2005/073350 | 8/2005 |

OTHER PUBLICATIONS

Written Opinion of the International Searching Authority for International Application No. PCT/US2007/081900.

* cited by examiner

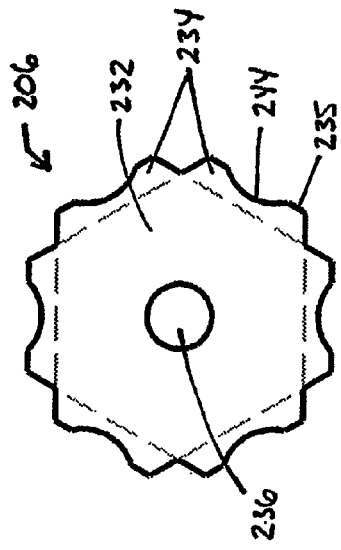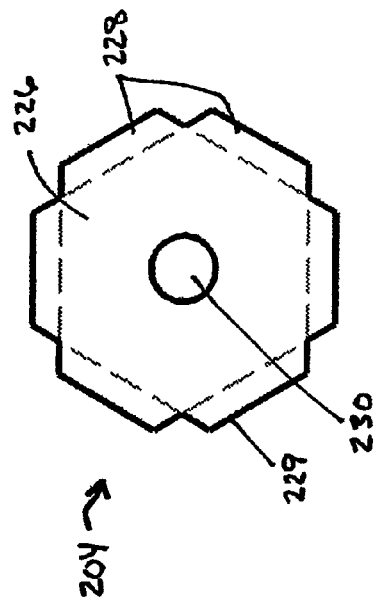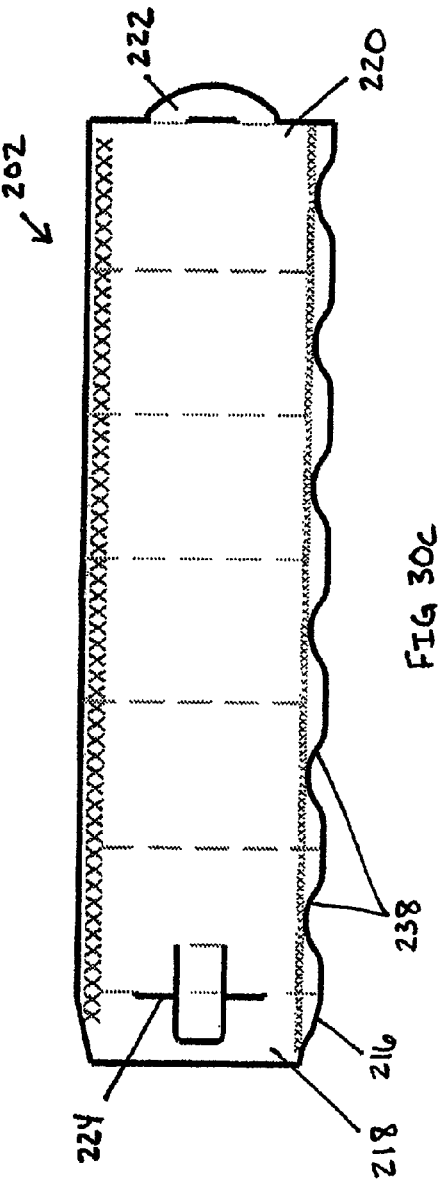
FIG 30a
FIG 30b
FIG 30c

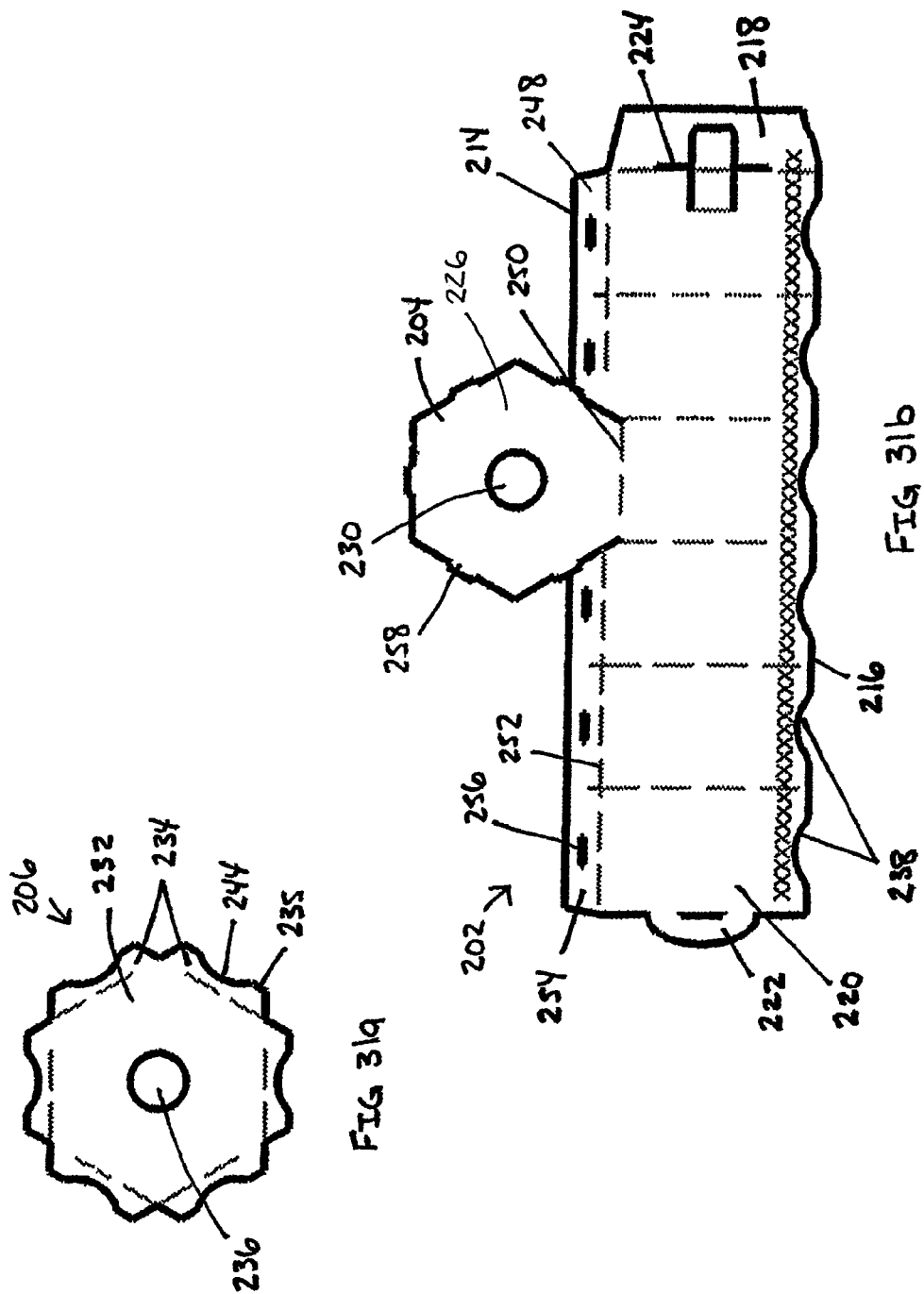

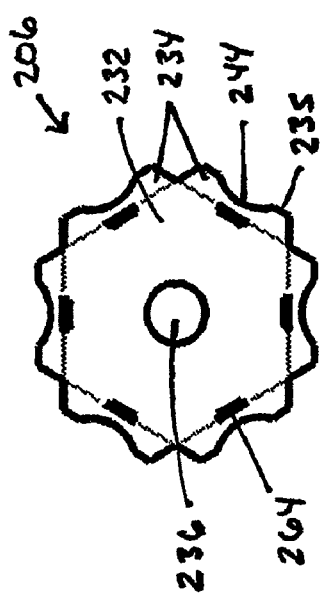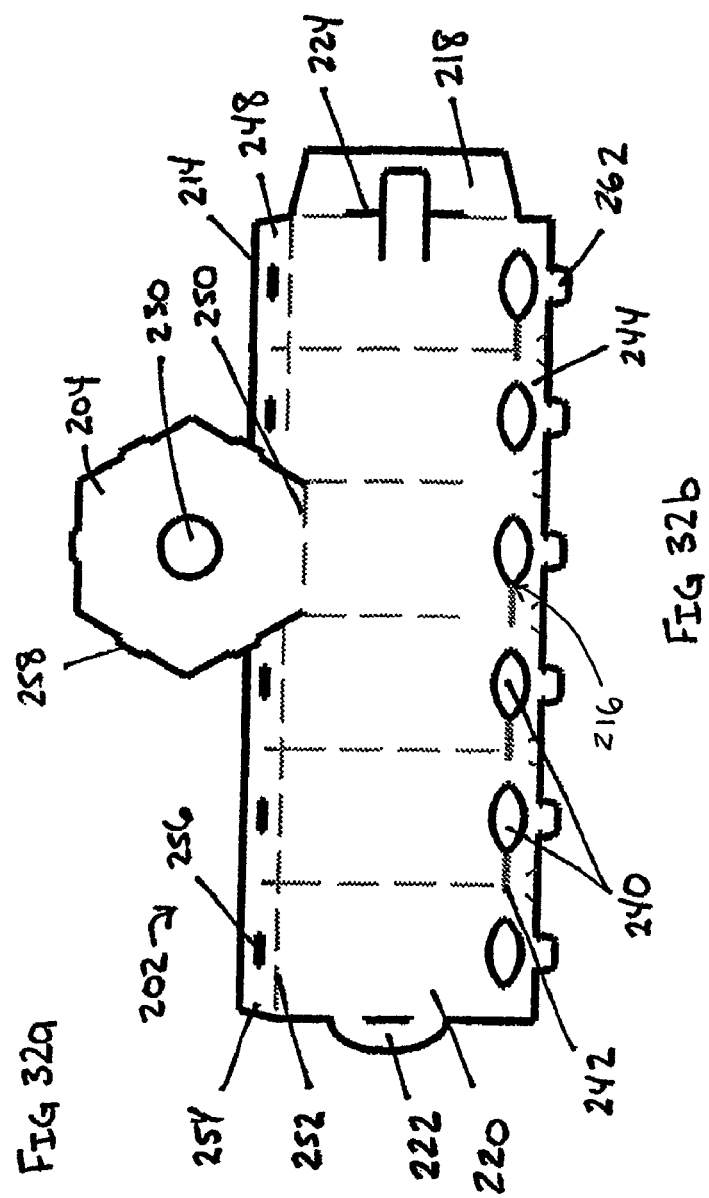

COMBUSTIBLE PACKAGES FOR CONTAINING A FUEL SOURCE AND A FIRE STARTER

CROSS-REFERENCE TO RELATED APPLICATION

This application claims the benefit of U.S. Provisional Application No. 60/862,140 filed Oct. 19, 2006 and U.S. Provisional Application No. 60/894,122 filed Mar. 9, 2007, now abandoned each of which is hereby incorporated by reference in its entirety.

FIELD OF THE INVENTION

Embodiments of the present invention relate to the packaging of charcoal briquettes and fire starters.

BACKGROUND OF THE INVENTION

Charcoal briquettes are compressed blocks of black porous carbonaceous material used to provide the heat for barbequing or grilling food. Although the blocks can come in several shapes, the blocks are generally pillow-shaped. Typically, charcoal briquettes are placed in a bottom of a grill, ignited, and burn to coals over time providing the heat for cooking the food.

Charcoal briquettes are very messy, often leaving a black residue on items, such as a user's clothes or skin, upon contact. Therefore it is desirable to keep the manual handling of charcoal briquettes to a minimum.

One of the most common packages for charcoal briquettes is a large bag containing a predetermined weight of charcoal briquettes. The size and weight of the bags vary usually from five pounds to 20 pounds.

Typically the bag package contains enough charcoal briquettes for multiple uses. Therefore the bag package requires the transfer of a partial amount of charcoal briquettes from the bag to the grill. Due to the bag's weight and shape and the messiness associated with charcoal, this transfer step is undesirable.

Also, in order to adequately ignite the charcoal briquettes some sort of kindling or fire starter must be employed. The most common fire starter is lighter fluid. However, lighter fluid by design is very flammable and thus dangerous. Lighter fluid also may leave an unpleasant odor and/or taste on the food being cooked.

The bag package of charcoal briquettes contains only briquettes. Therefore in order to successfully use the bag of charcoal briquettes, a separate purchase of kindling or fire starter in a separate package is required. This separate package contains a flammable material and requires extra care.

Alternative packages are available. The alternative packages may contain only enough charcoal briquettes for one use and do not require additional handling of the charcoal briquettes because the packages are combustible. However, these packages are more expensive because the packages often require complex structures, such as internal panels to create flues or chimneys. Also, the charcoal briquettes often used in these packages are presoaked with a flammable liquid, such as lighter fluid, to initiate the burning of the charcoal. However, this also causes the charcoal to burn too quickly and is not desirable.

Cost is always an issue with packaging. However, the cost of charcoal briquettes packaging is especially sensitive. Charcoal briquettes and its packaging are used only once and then disposed of. Therefore consumers are unwilling to spend any significant amount on the packaging.

In light of the foregoing, it is desirable to provide a package that is inexpensive to produce and is designed to hold both charcoal briquettes and a fire starter without requiring any additional handling of the charcoal briquettes by the user.

SUMMARY

Embodiments of the present invention address the above needs and achieve other advantages by providing combustible packages for containing a fuel source and a fire starter.

According to an embodiment, a combustible package includes an outer wall, a top lid, a bottom lid, and a fire starter. The outer wall may extend from a top edge defining a top opening to a bottom edge defining a bottom opening. The top lid substantially closes the top opening. The bottom lid substantially closes the bottom opening. Also, the top lid defines a first central opening and the bottom lid defines a second central opening. The fire starter extends from a first end to a second end. The first end may be held at least partially within the first central opening and the second end may be held at least partially within the second central opening. The combustible package may further include a fuel source contained between the outer wall, the top lid, the bottom lid, and the fire starter.

The fire starter may include a spirally wound paper tube impregnated with an accelerant. Examples of an accelerant include a paraffin wax and a vegetable oil.

The outer wall may comprise a cardboard and define a hexagonal-shaped cross-section. The outer wall may also include an outer surface having printed indicia. The outer wall may define one or more ventilation openings between the bottom edge and the bottom lid. In another embodiment, the bottom edge may be scalloped for providing ventilation openings.

The bottom lid may include a central panel configured to extend across the bottom opening and a plurality of tabs configured to extend along an inner surface of the outer wall. Each of the plurality of tabs may include a scalloped outer edge for aligning with a scalloped bottom edge of the outer wall.

The top lid may include a central panel configured to extend across the top opening and a plurality of tabs configured to extend along an inner surface of the outer wall and facilitate a press fit between the top lid and the outer wall.

In another embodiment the combustible package includes a outer wall of cardboard, a top lid, and a bottom lid. The outer wall extends from a top edge defining a top opening to a bottom edge defining a bottom opening. The top lid includes a central panel and a plurality of tabs. The central panel is configured to extend across the top opening and define a first central opening. The tabs are configured to extend along an inner surface of the outer wall and facilitate a press fit between the top lid and the outer wall. The bottom lid includes a central panel and a plurality of tabs. The central panel is configured to extend across the bottom opening and define a second central opening. The tabs are configured to extend along the inner surface of the outer wall and facilitate a press fit between the top lid and the outer wall. The first central opening and the second central opening are substantially aligned along a longitudinal axis of the combustible package.

The outer wall may include an outer surface having printed indicia and a plurality of panels defining a hexagonal shape. The outer wall may define one or more ventilation openings between the bottom edge and the bottom lid. Or the bottom edge may be scalloped for providing ventilation openings.

Each of the plurality of tabs of the bottom lid may include a scalloped outer edge for aligning with the scalloped bottom edge of the outer wall.

The fire starter may extend from a first end to a second end. The first end may be held at least partially within the first central opening and the second end may be held at least partially within the second central opening. The fire starter may comprise a spirally wound paper tube impregnated with an accelerant.

BRIEF DESCRIPTION OF THE SEVERAL VIEWS OF THE DRAWINGS

Figure 1:
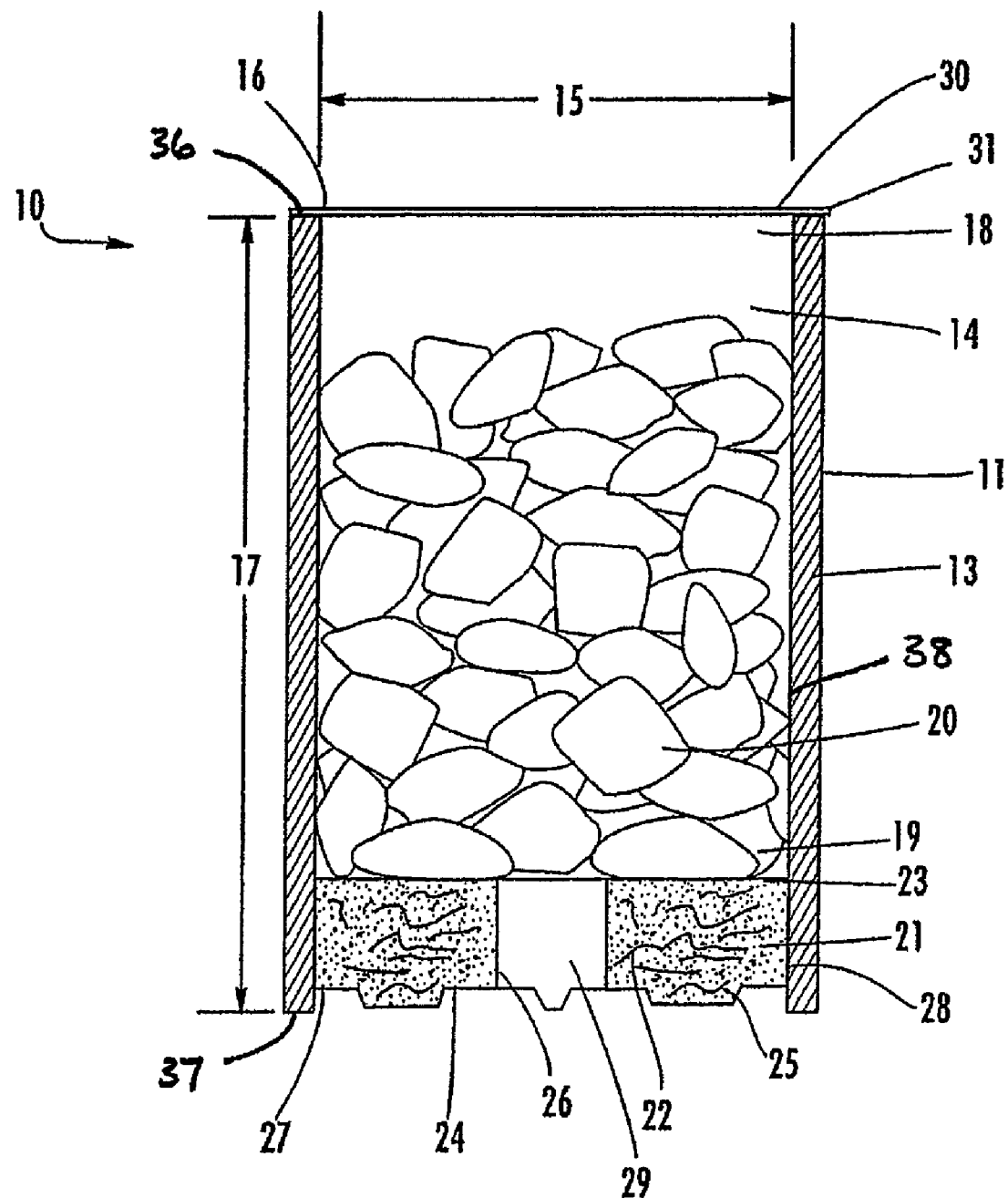
Figure 2:
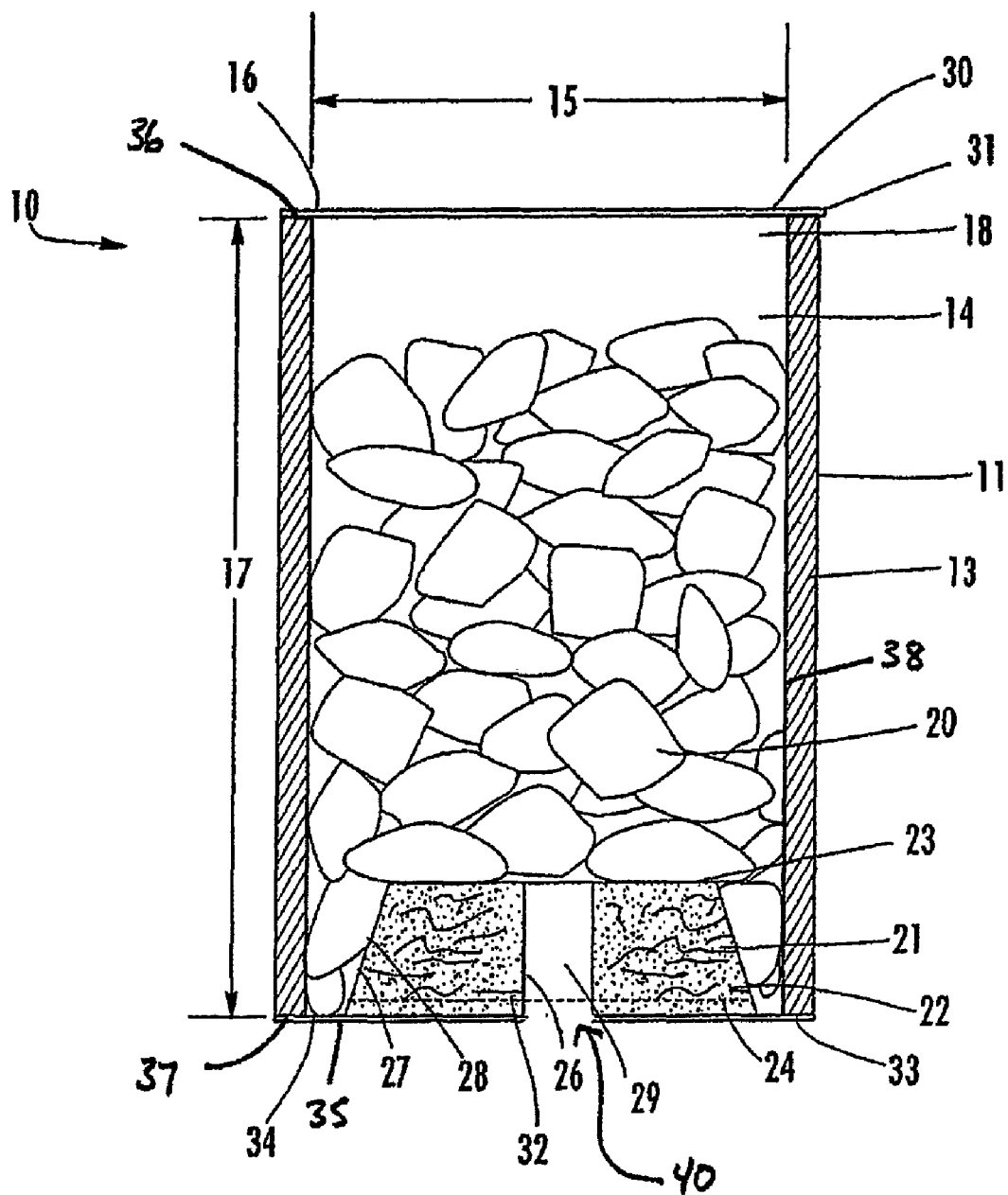
Figure 3:
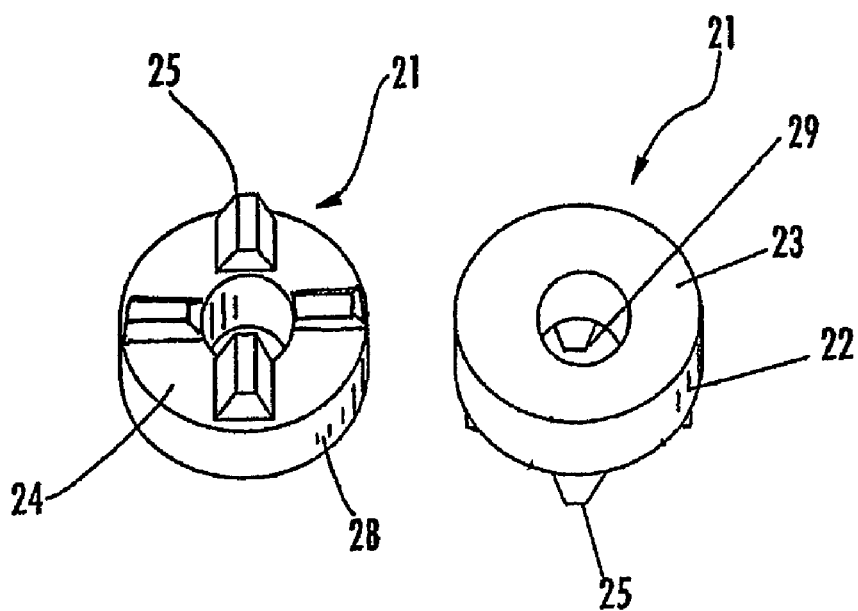
Figure 4:
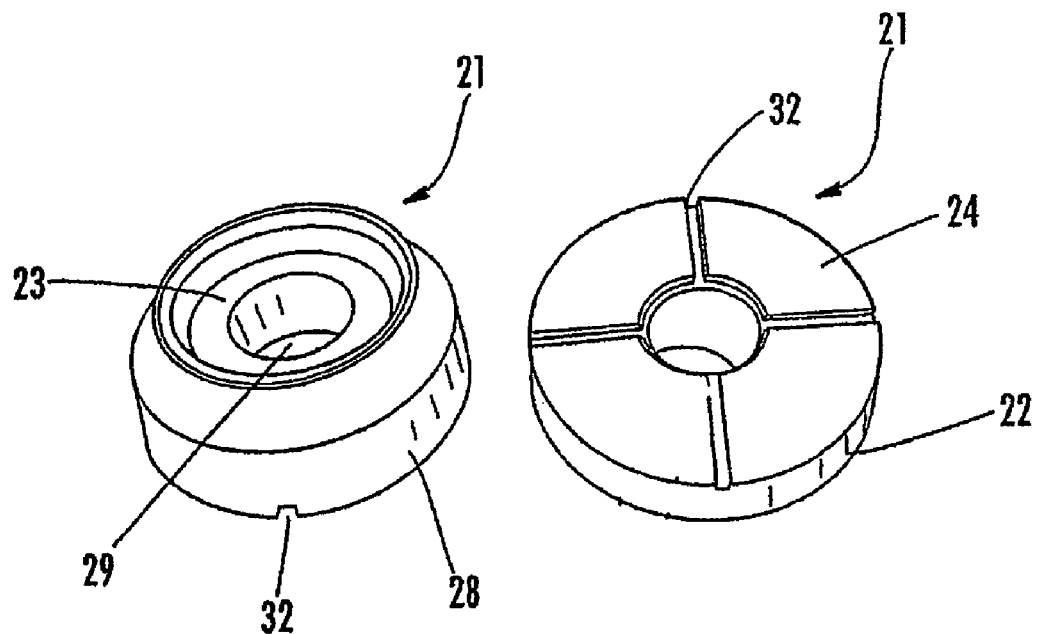
Figure 5:
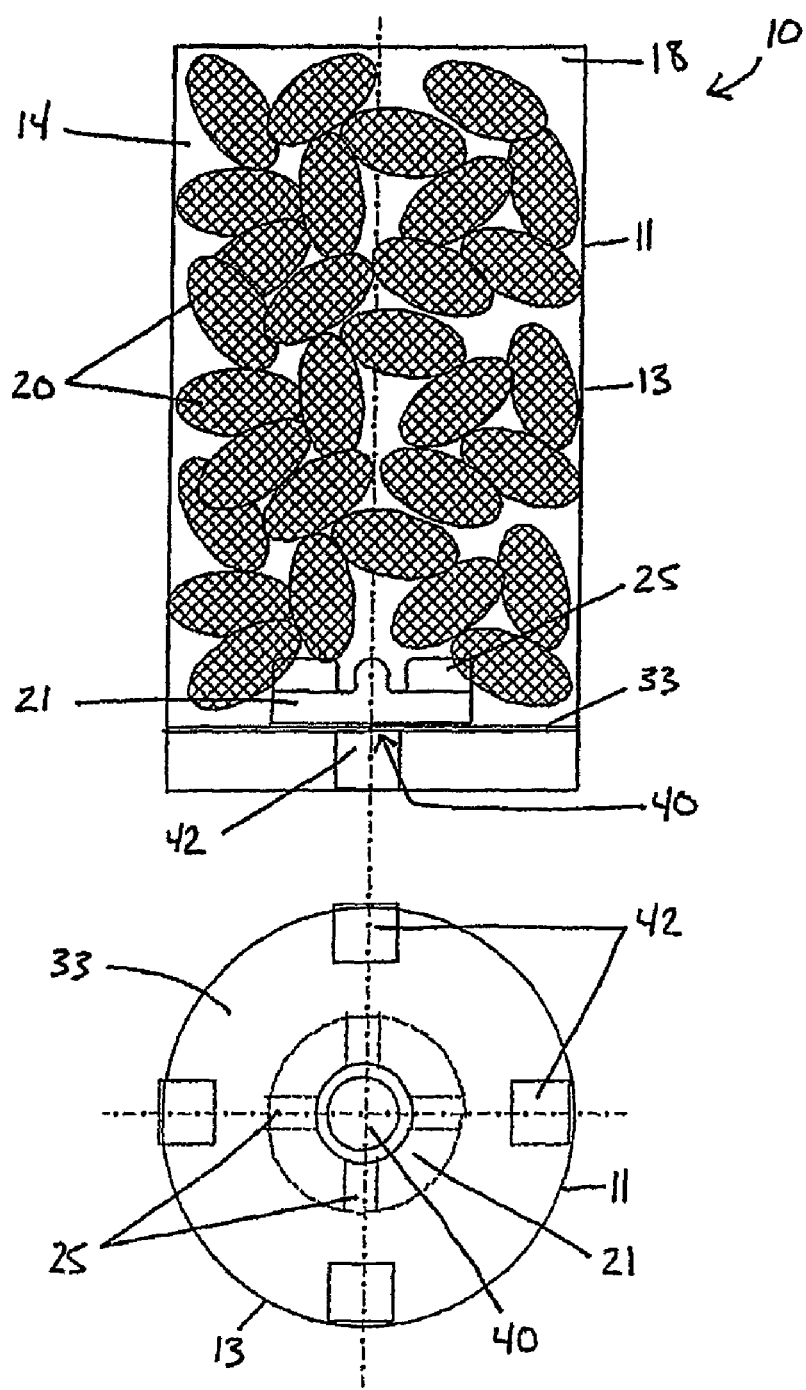
Figure 6:
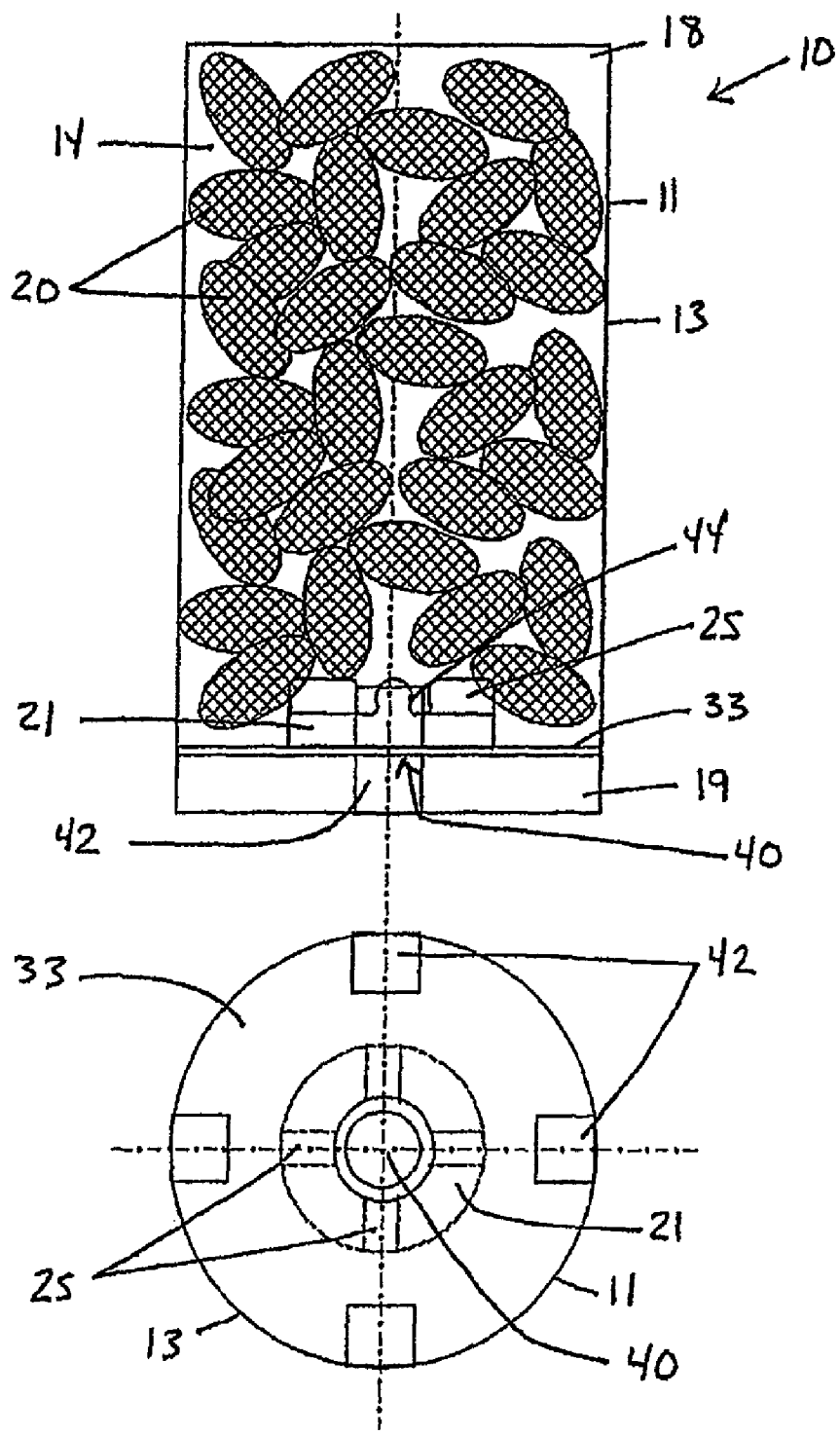
Figure 7:
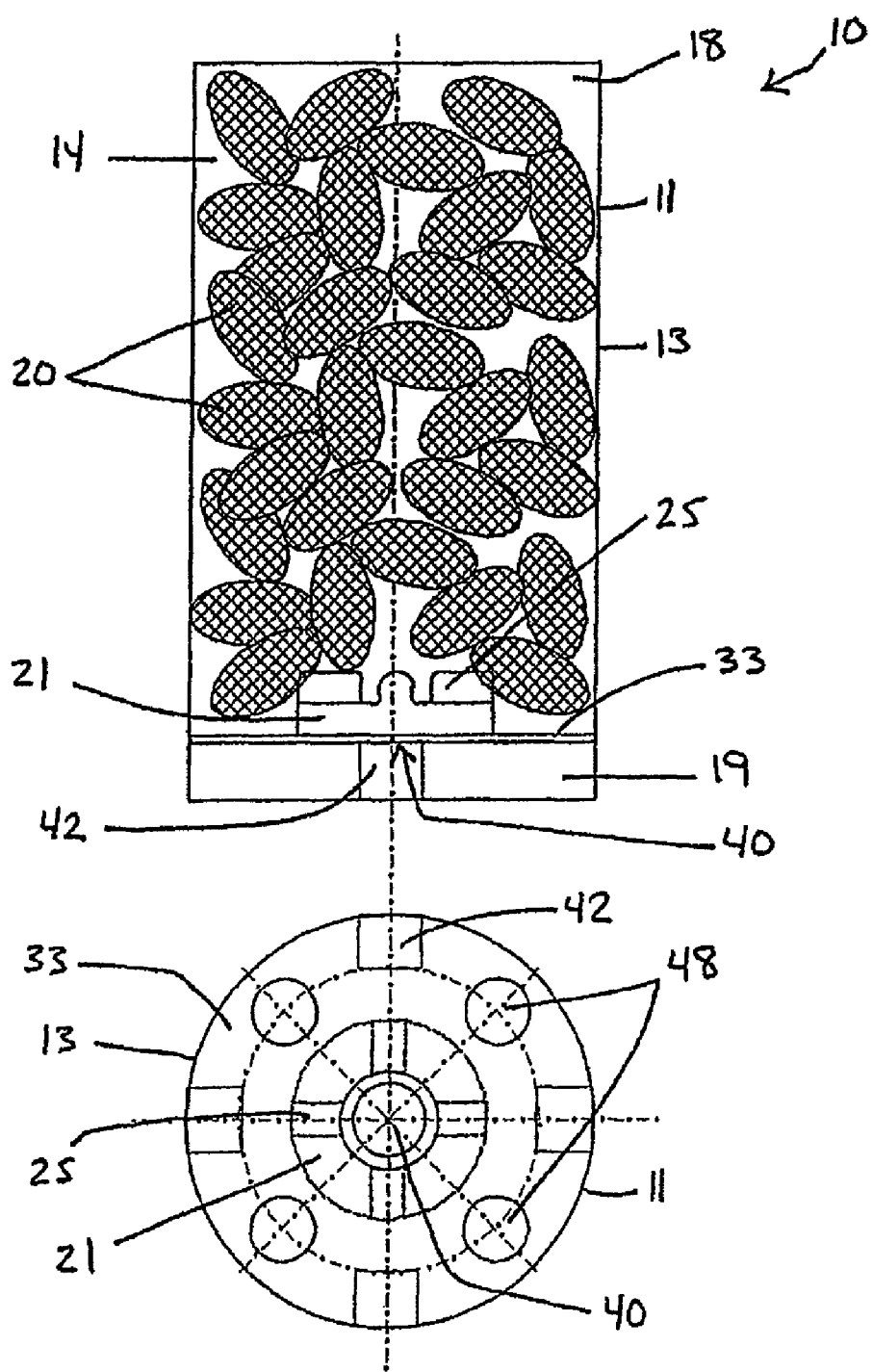
Figure 8:
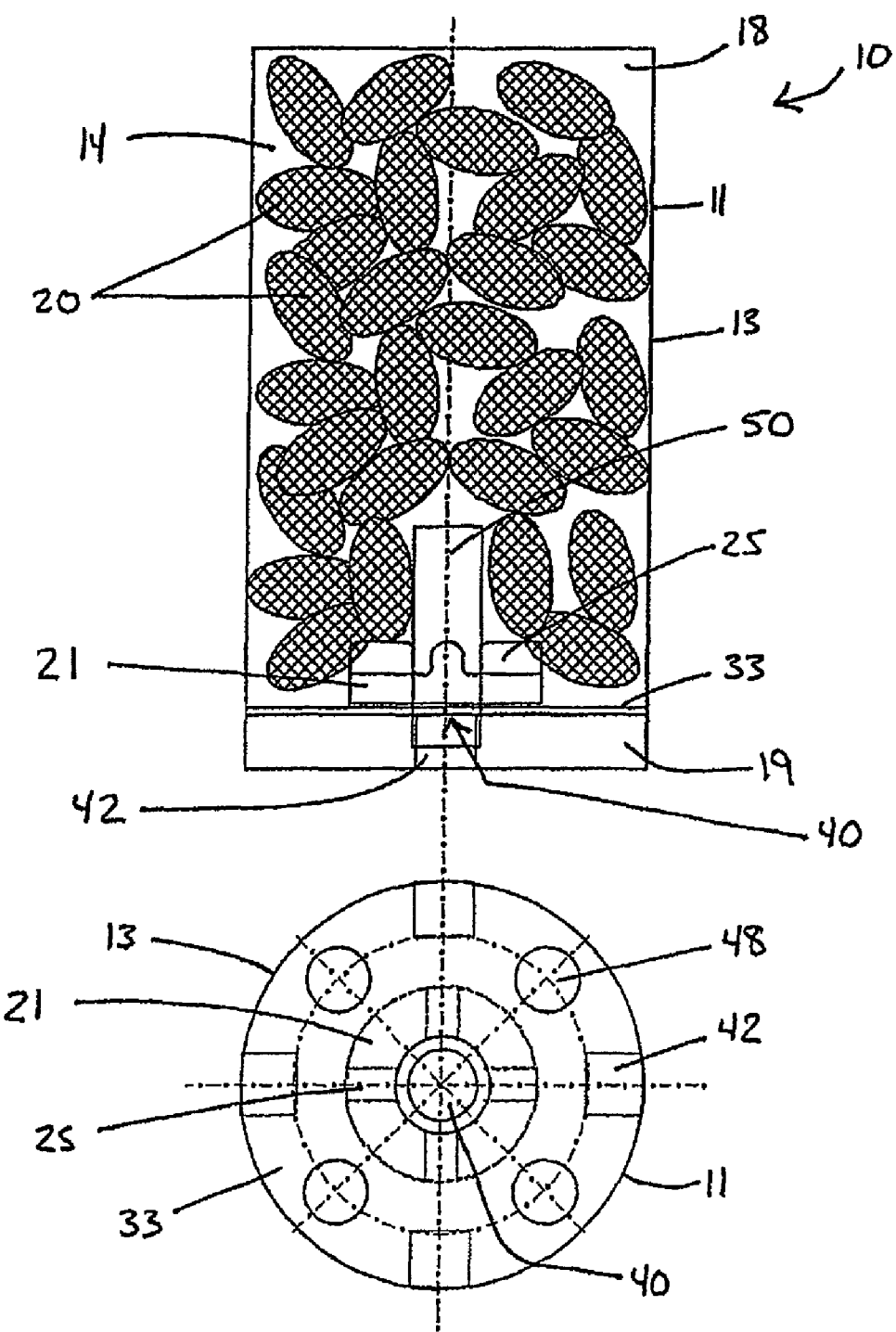
Figure 9:
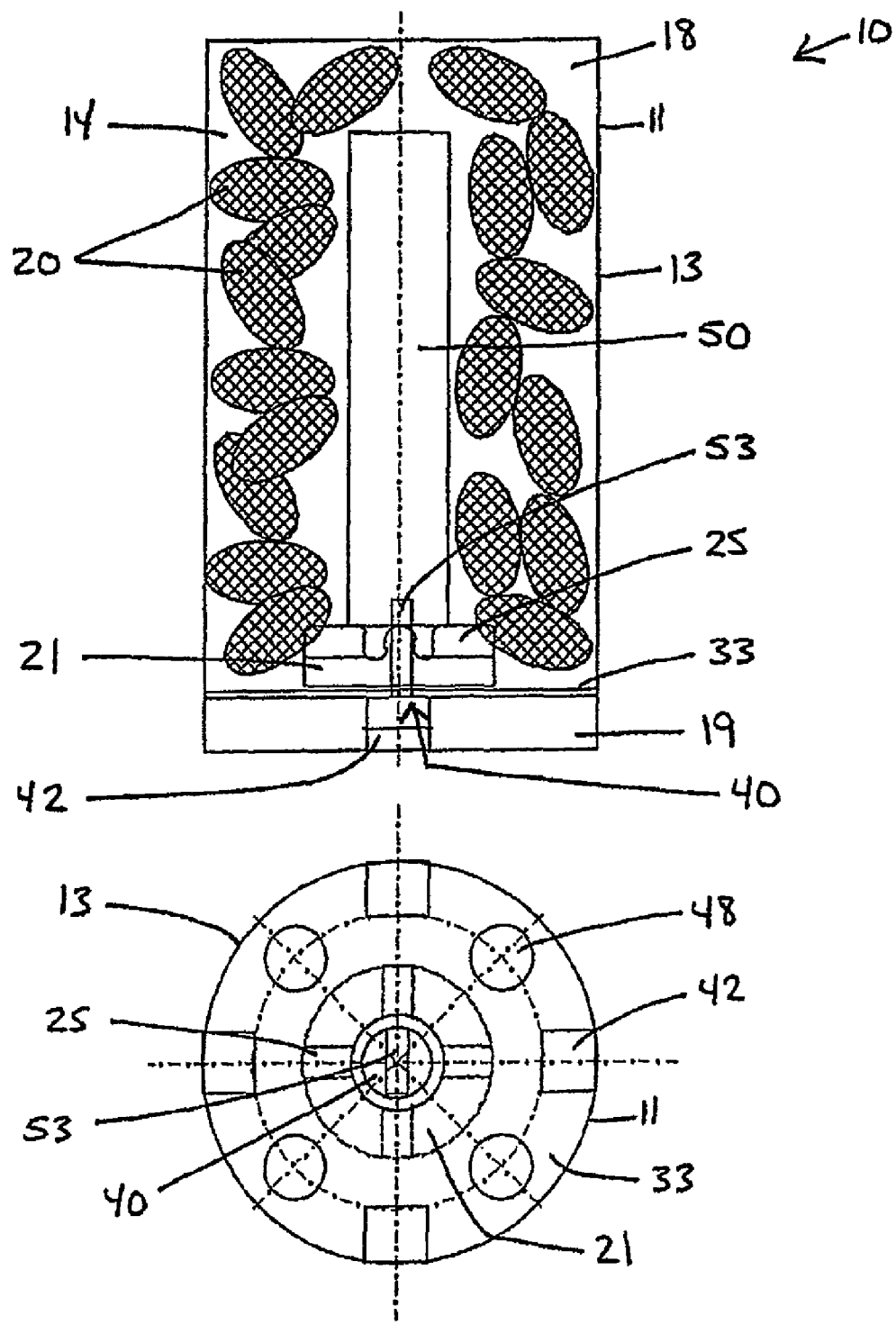
Figure 10:
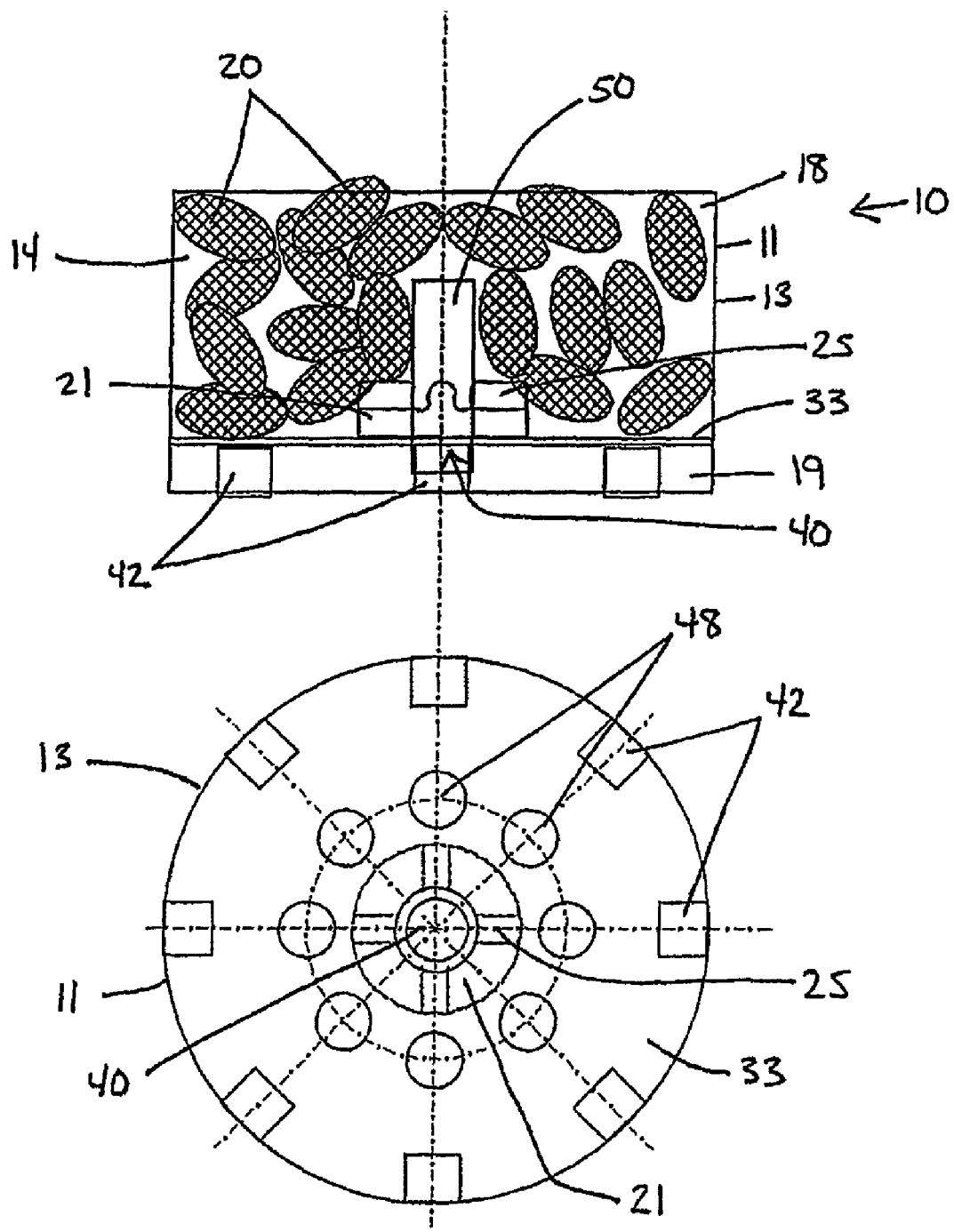
Figure 11:
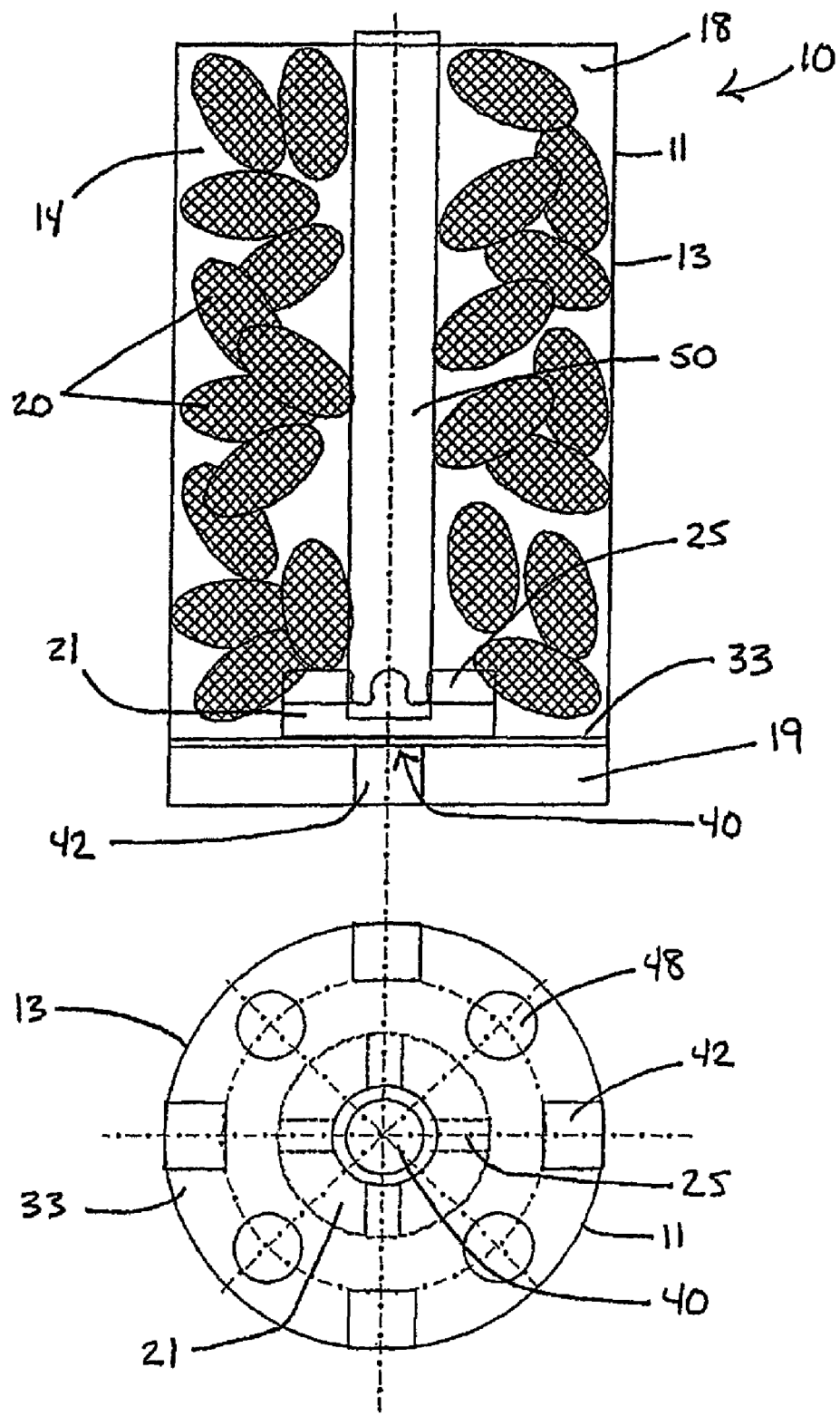
Figure 12:
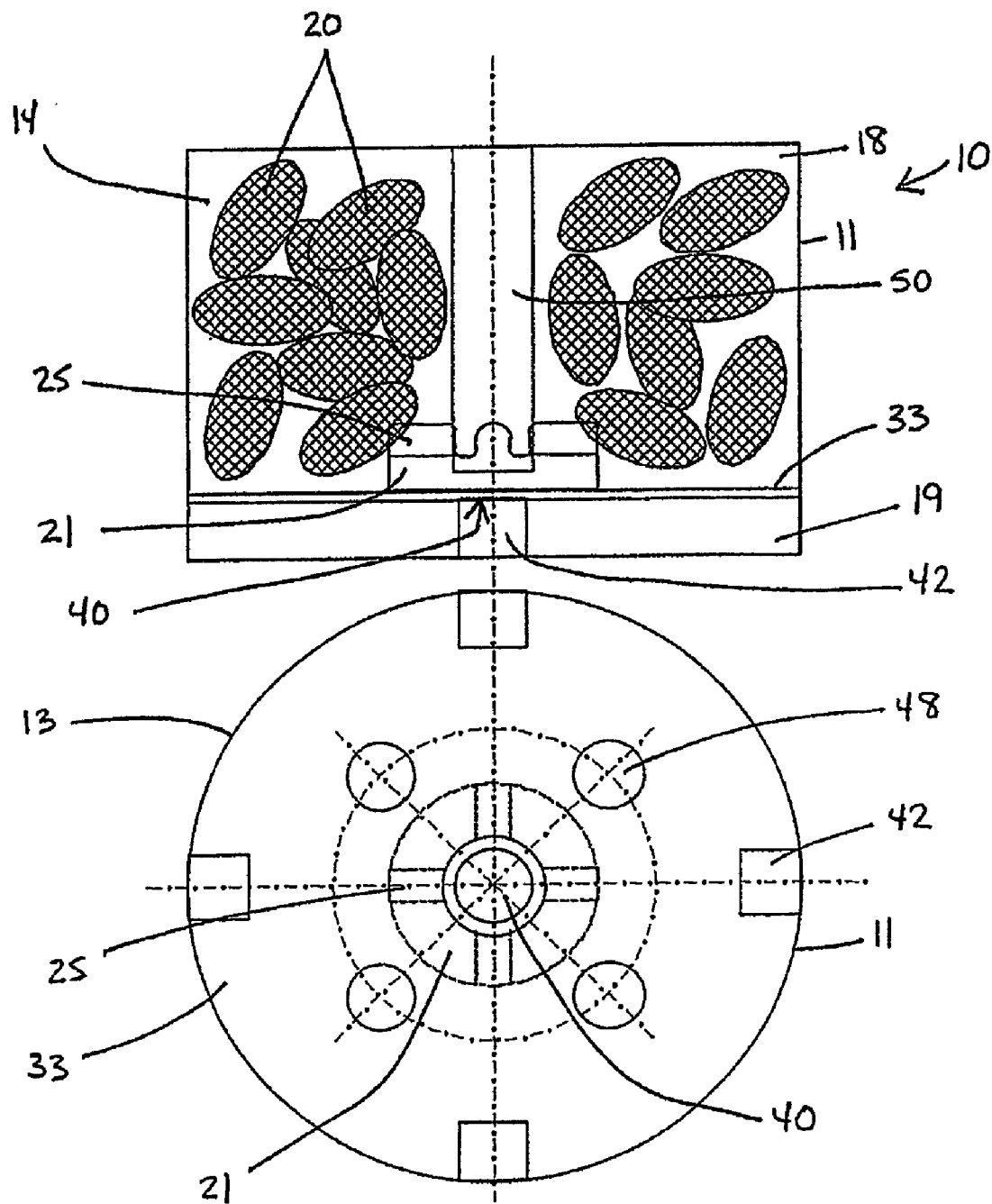
Figure 13:
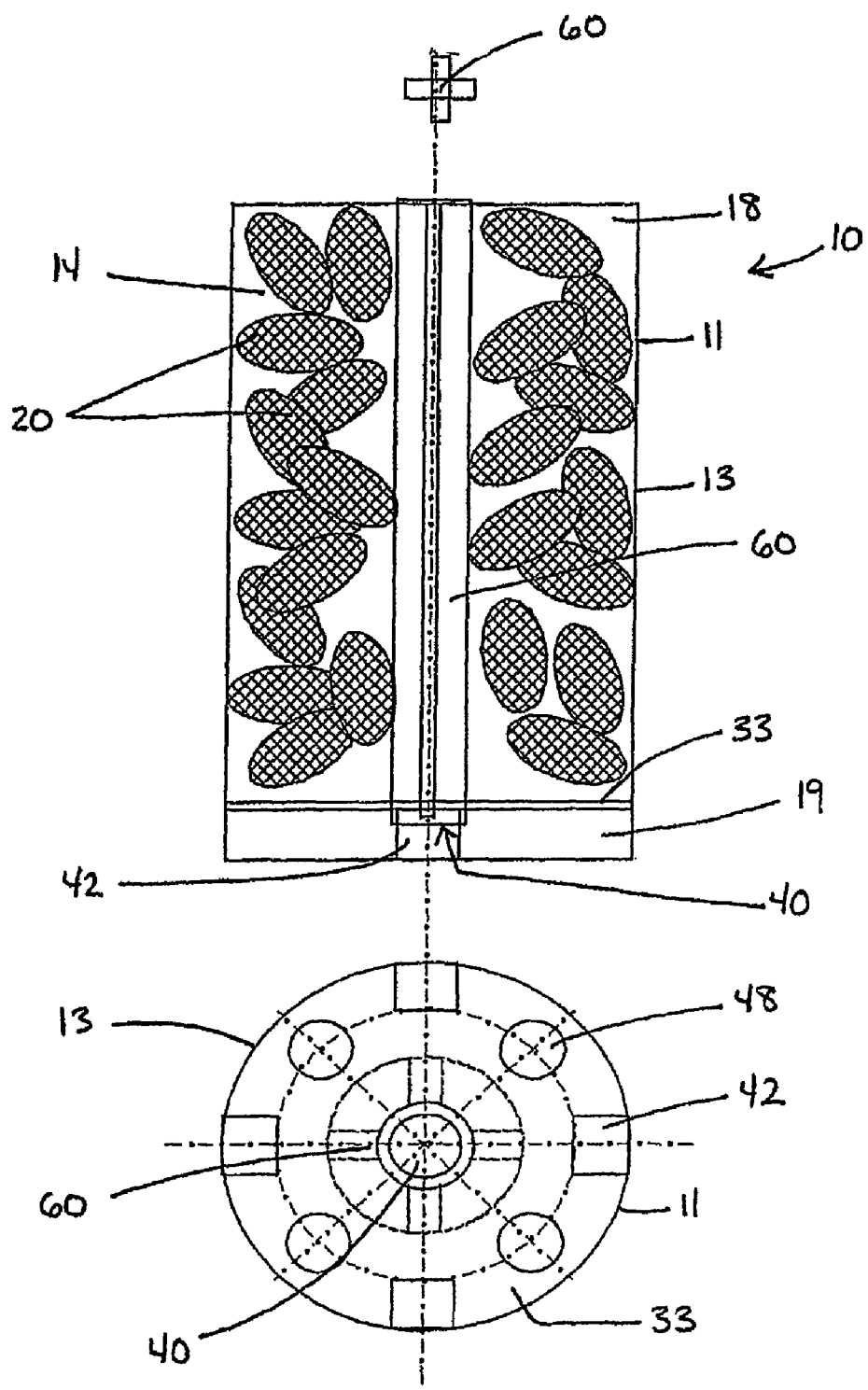
Figure 14:
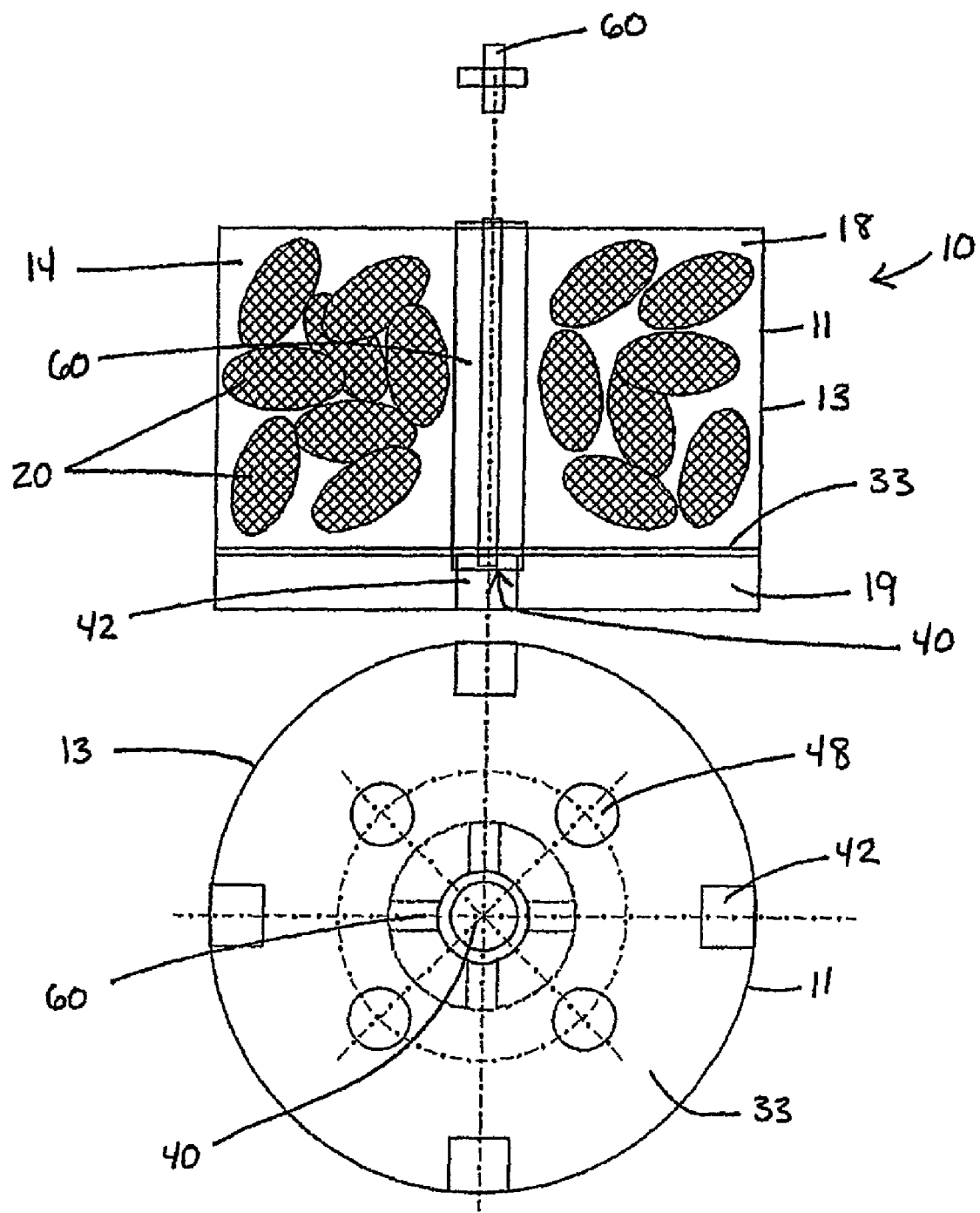
Figure 15:
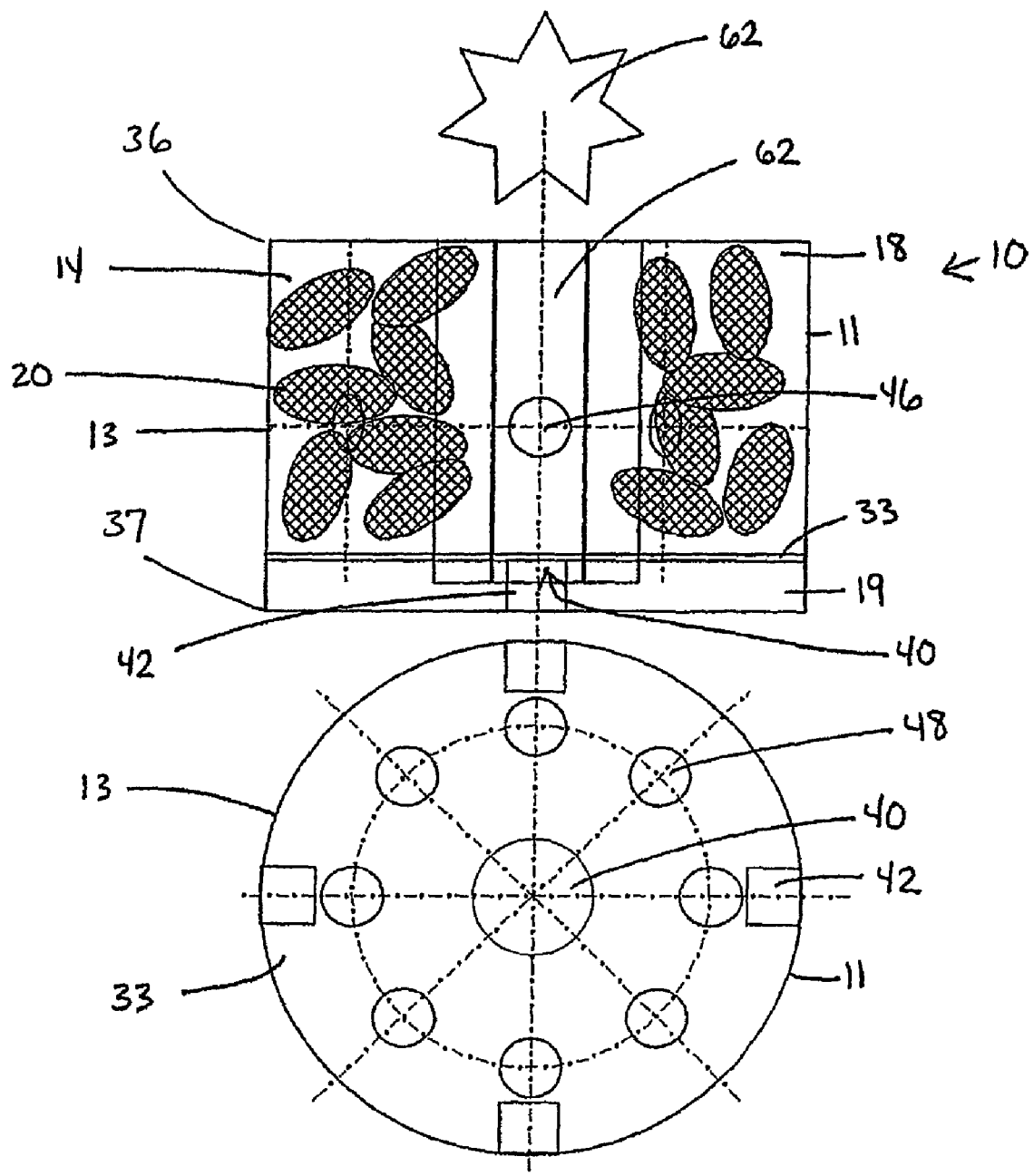
Figure 16:
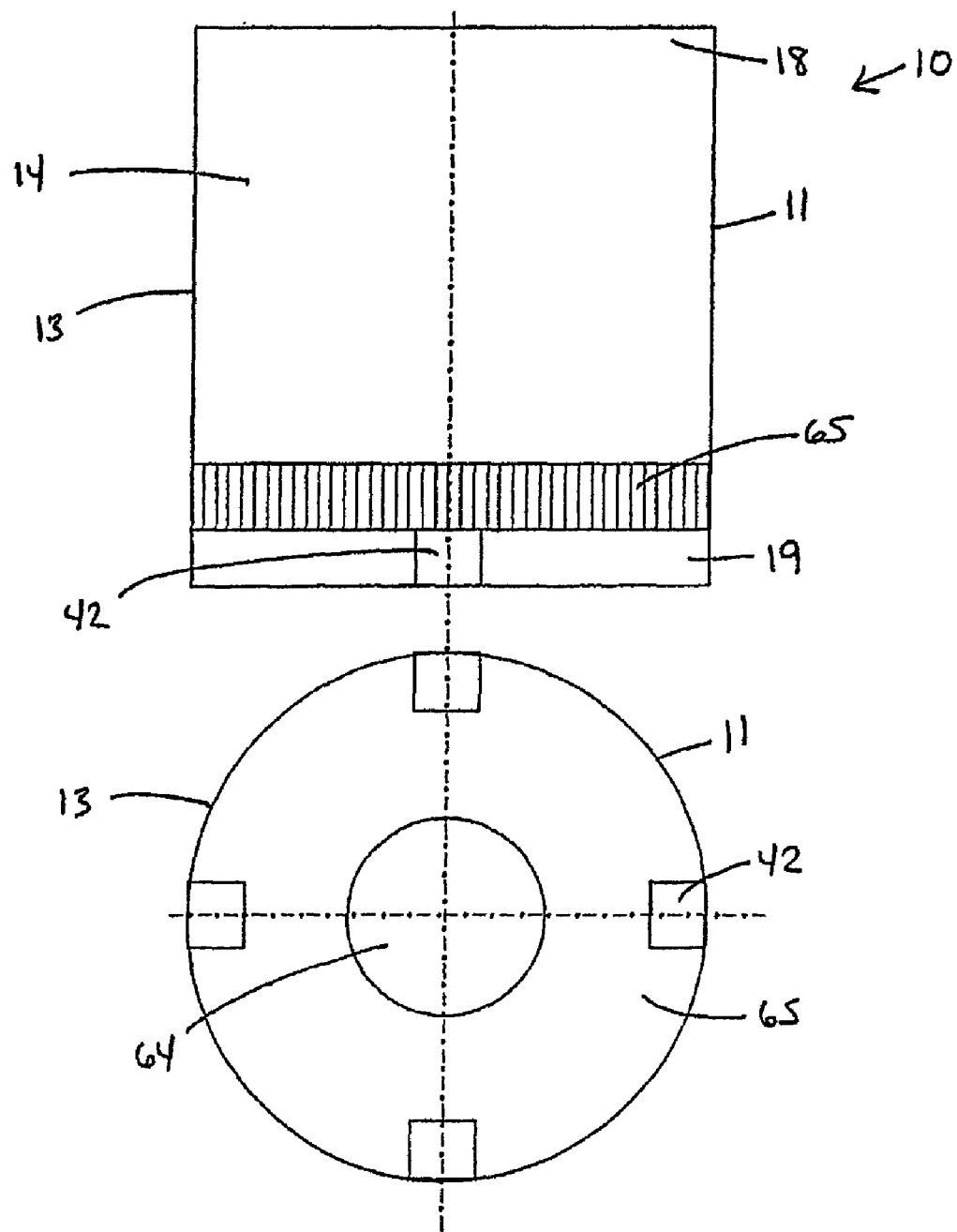
Figure 17:
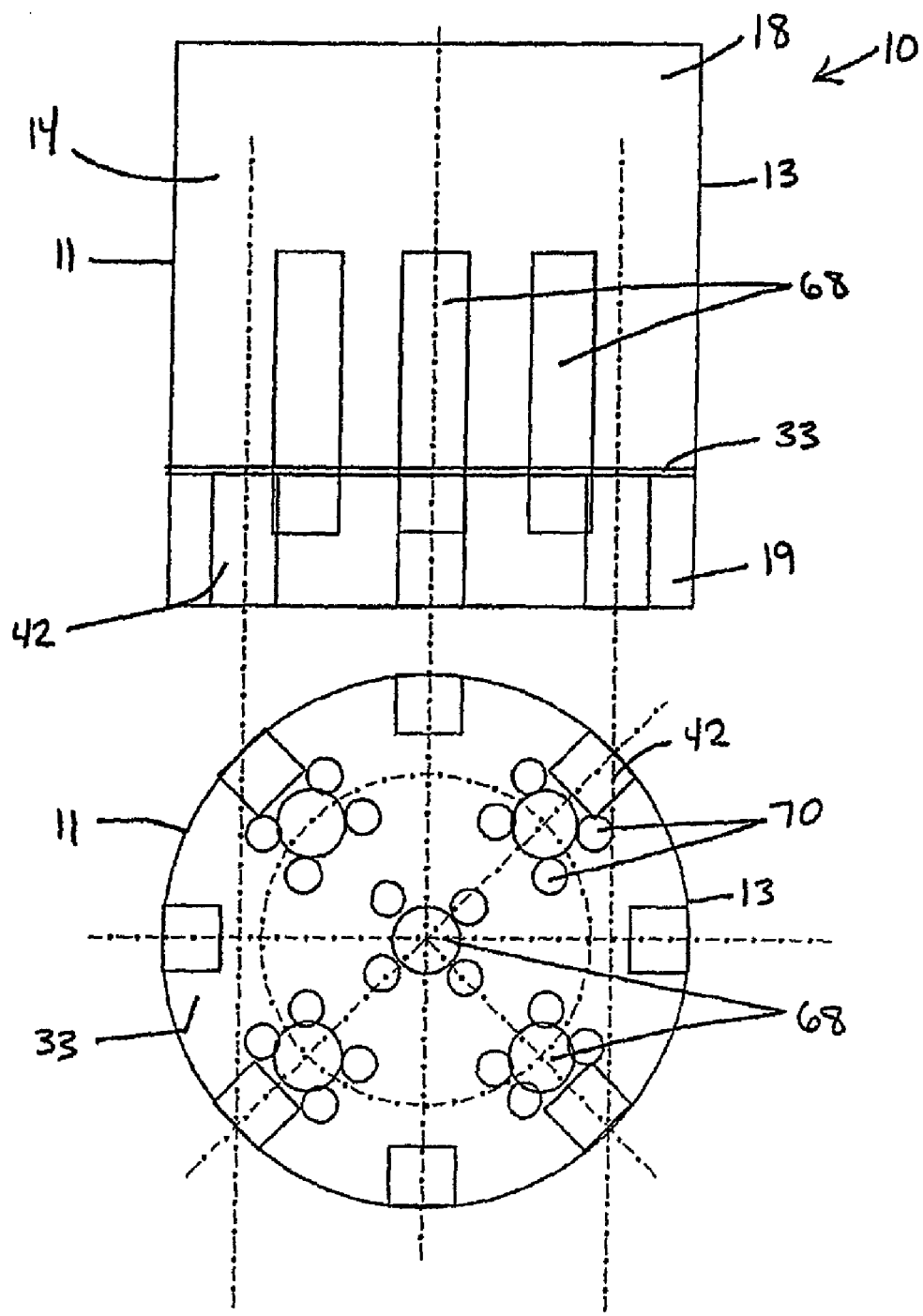
Figure 18:
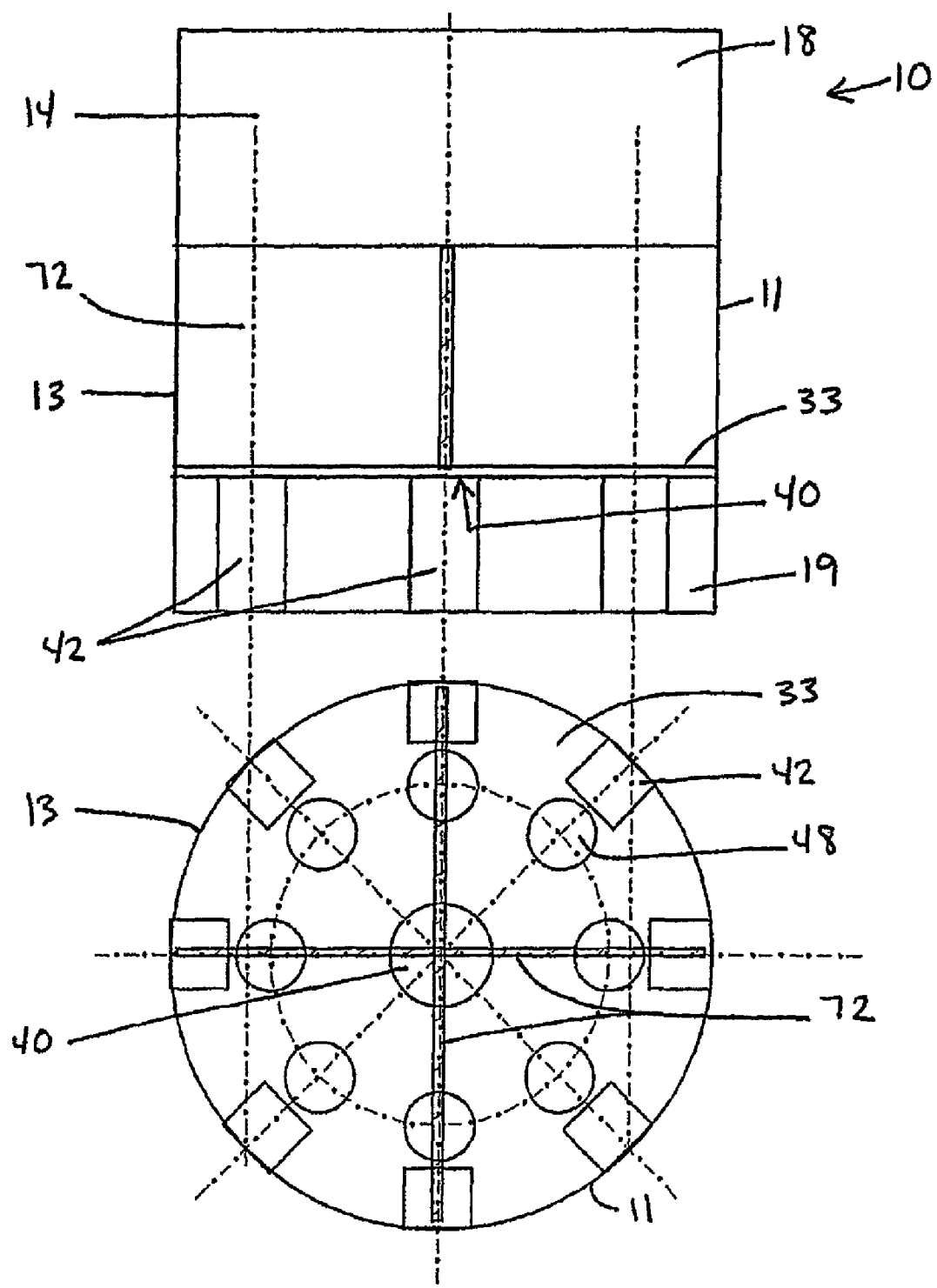
Figure 19:
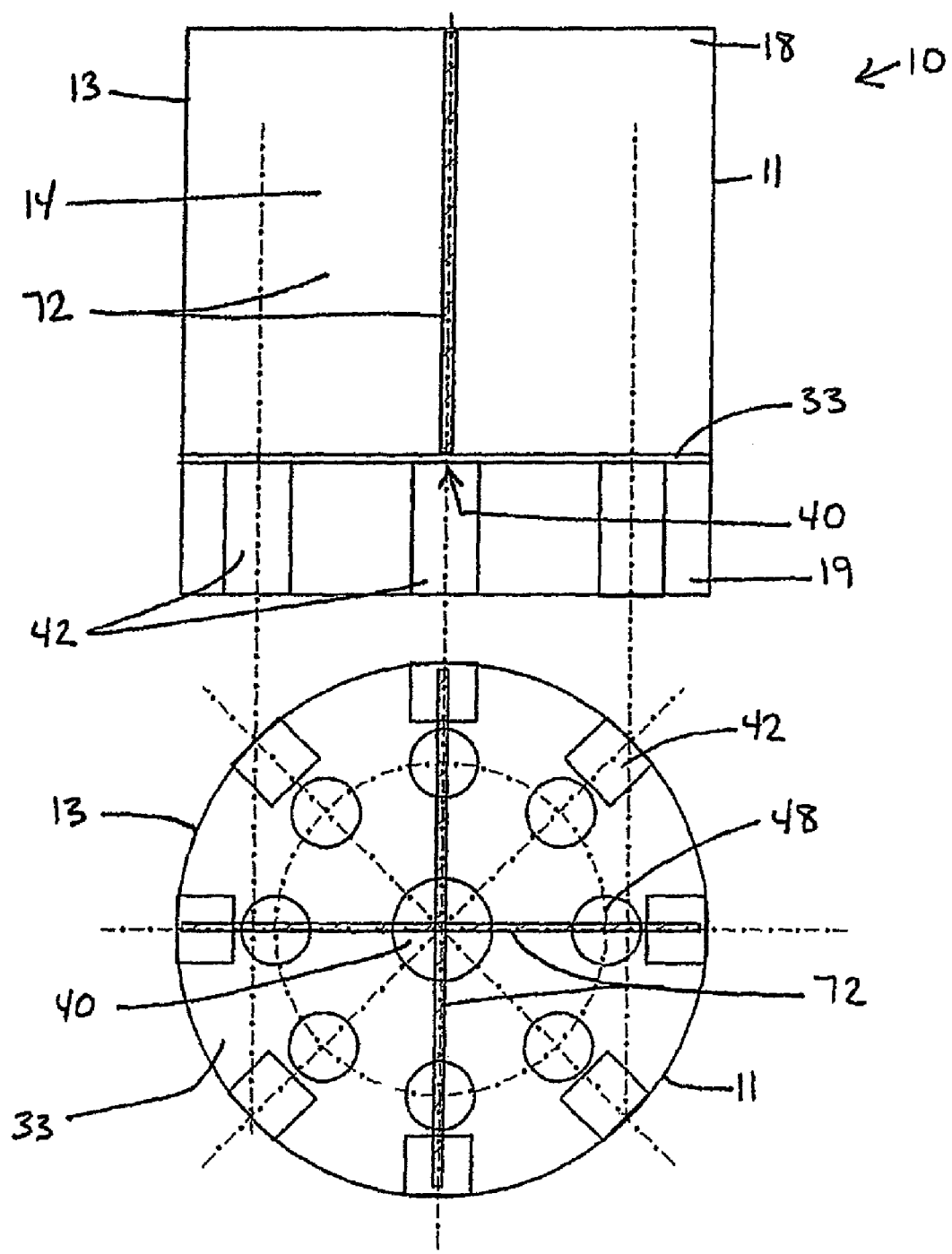
Figure 20:
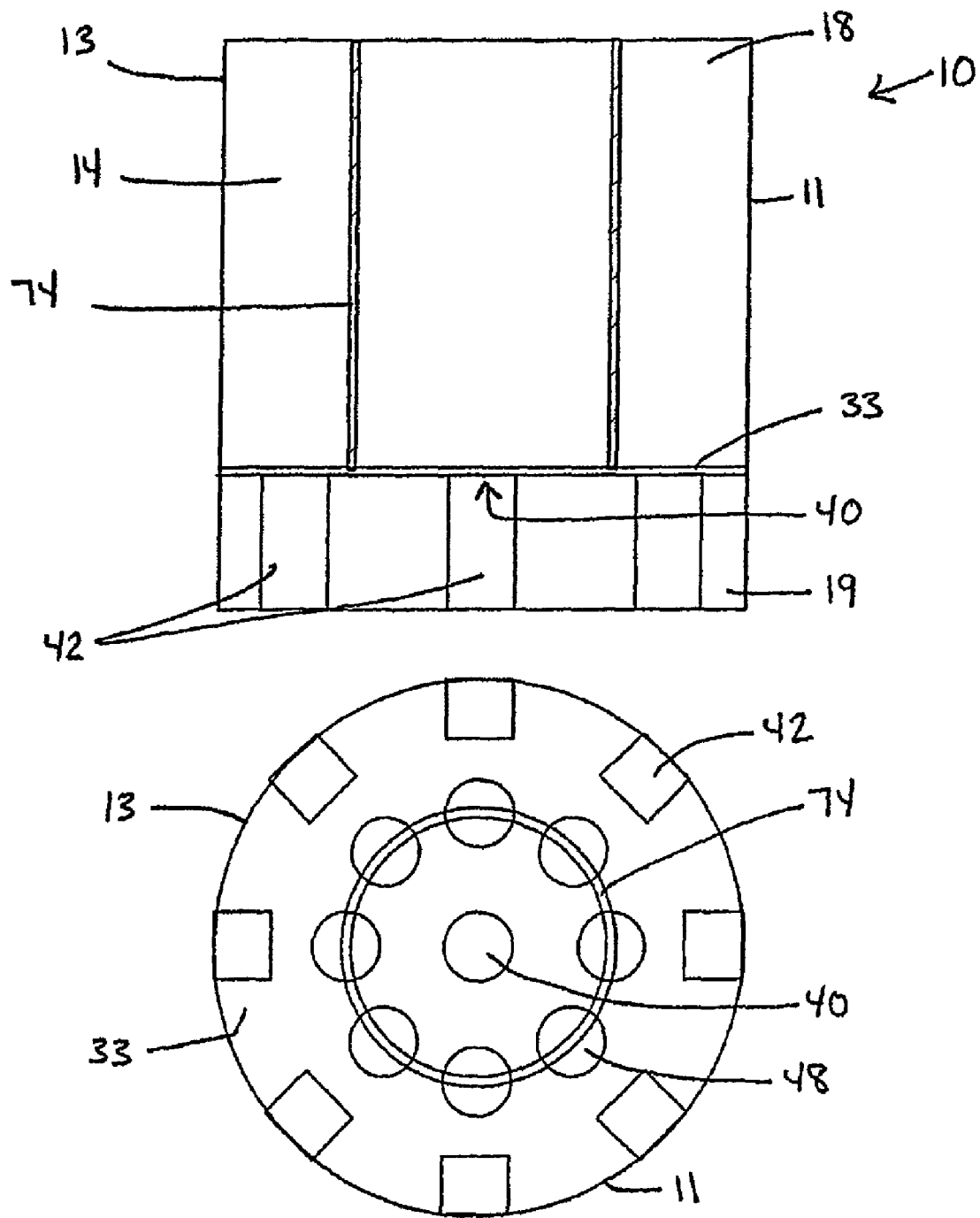
Figure 21:
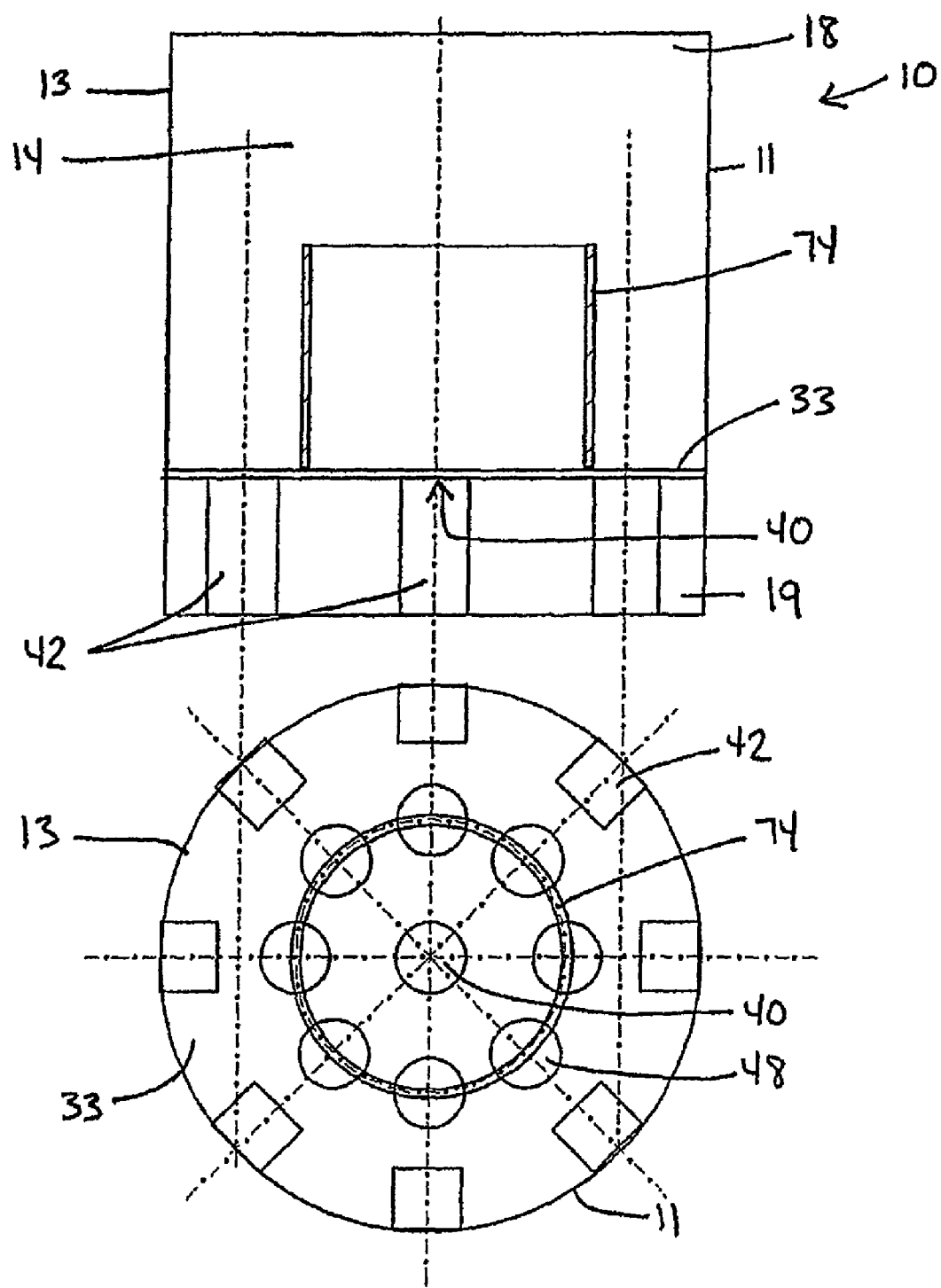
Figure 22:
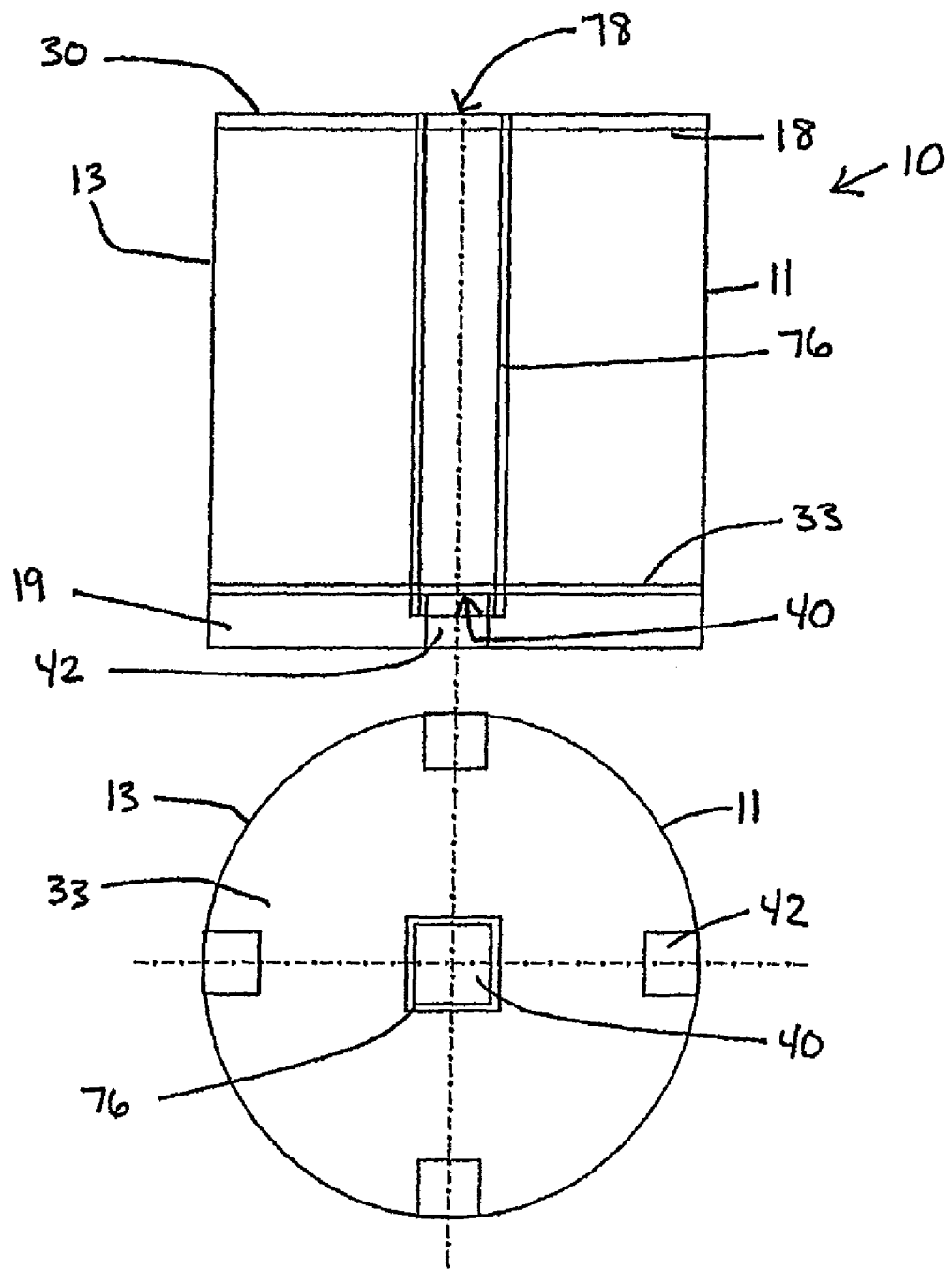
Figure 23:
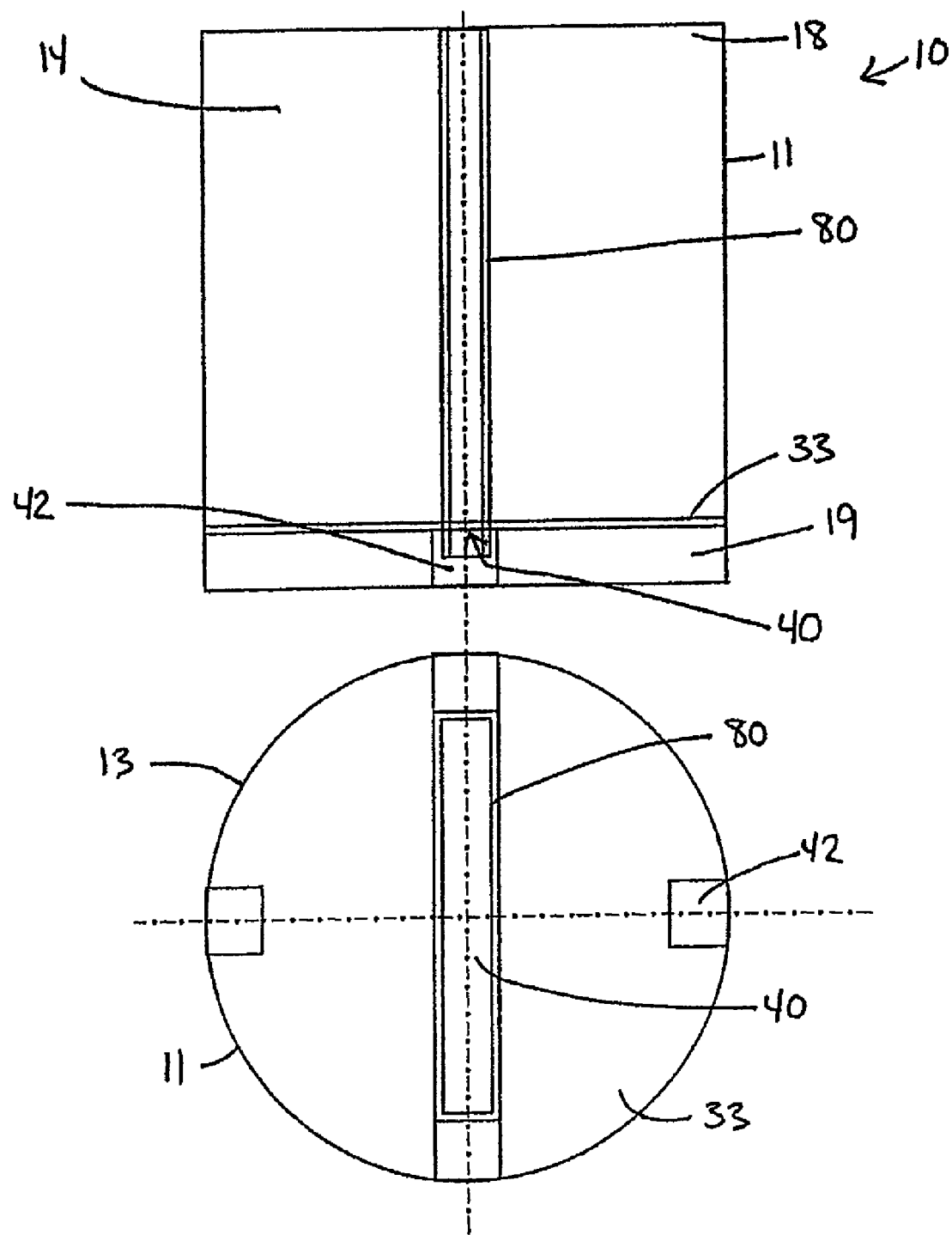
Figure 24:
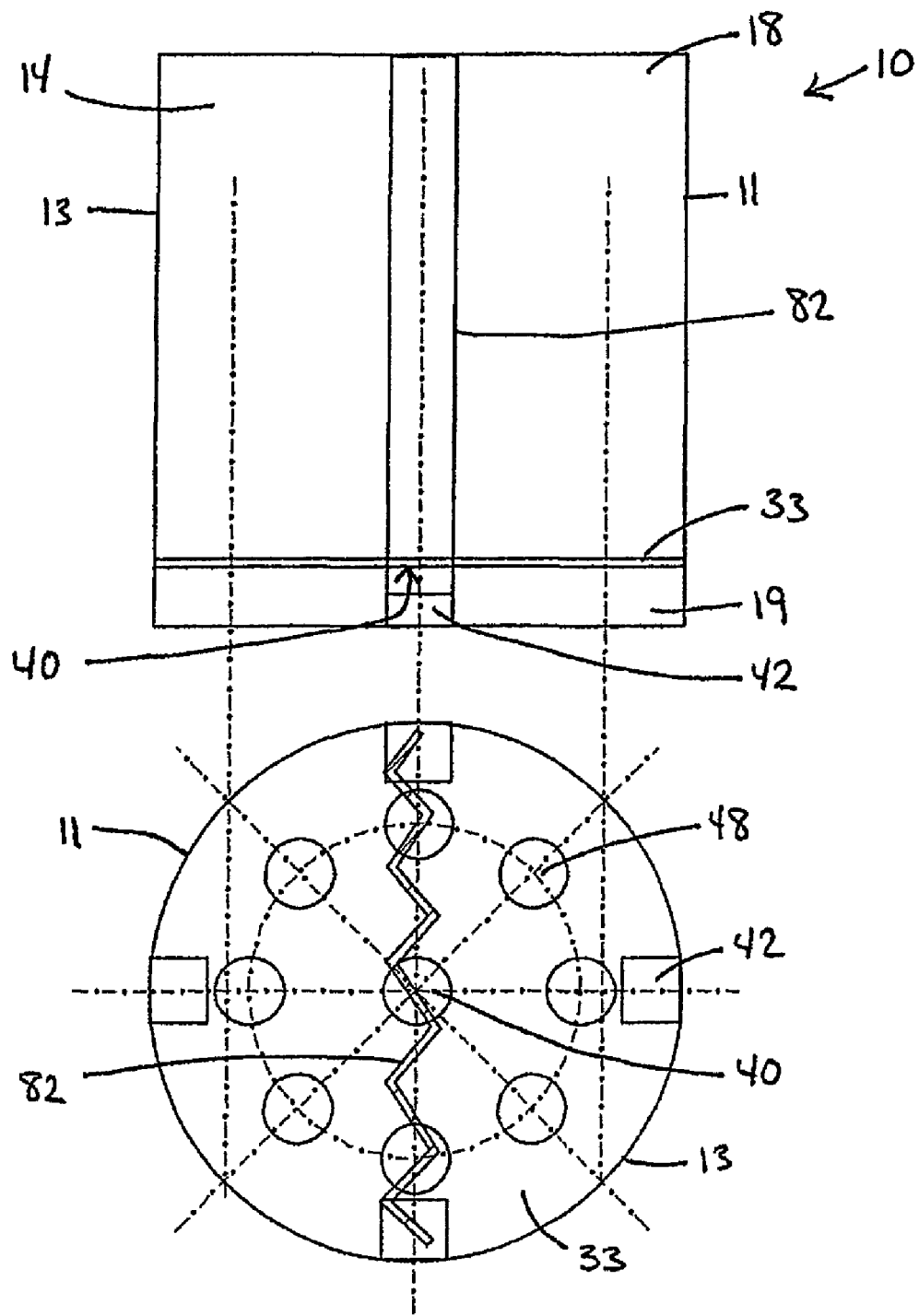
Figure 25:
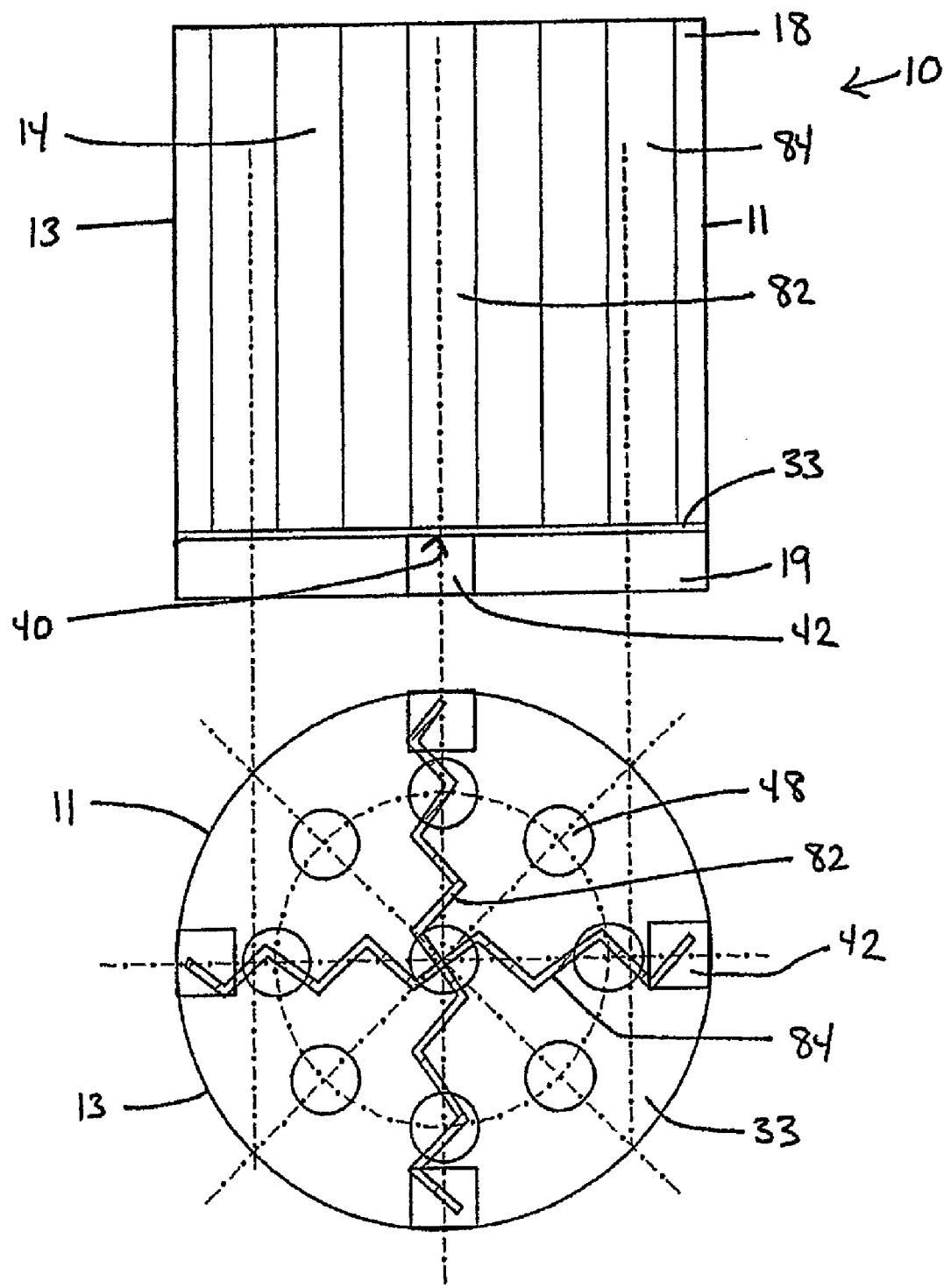
Figure 26:
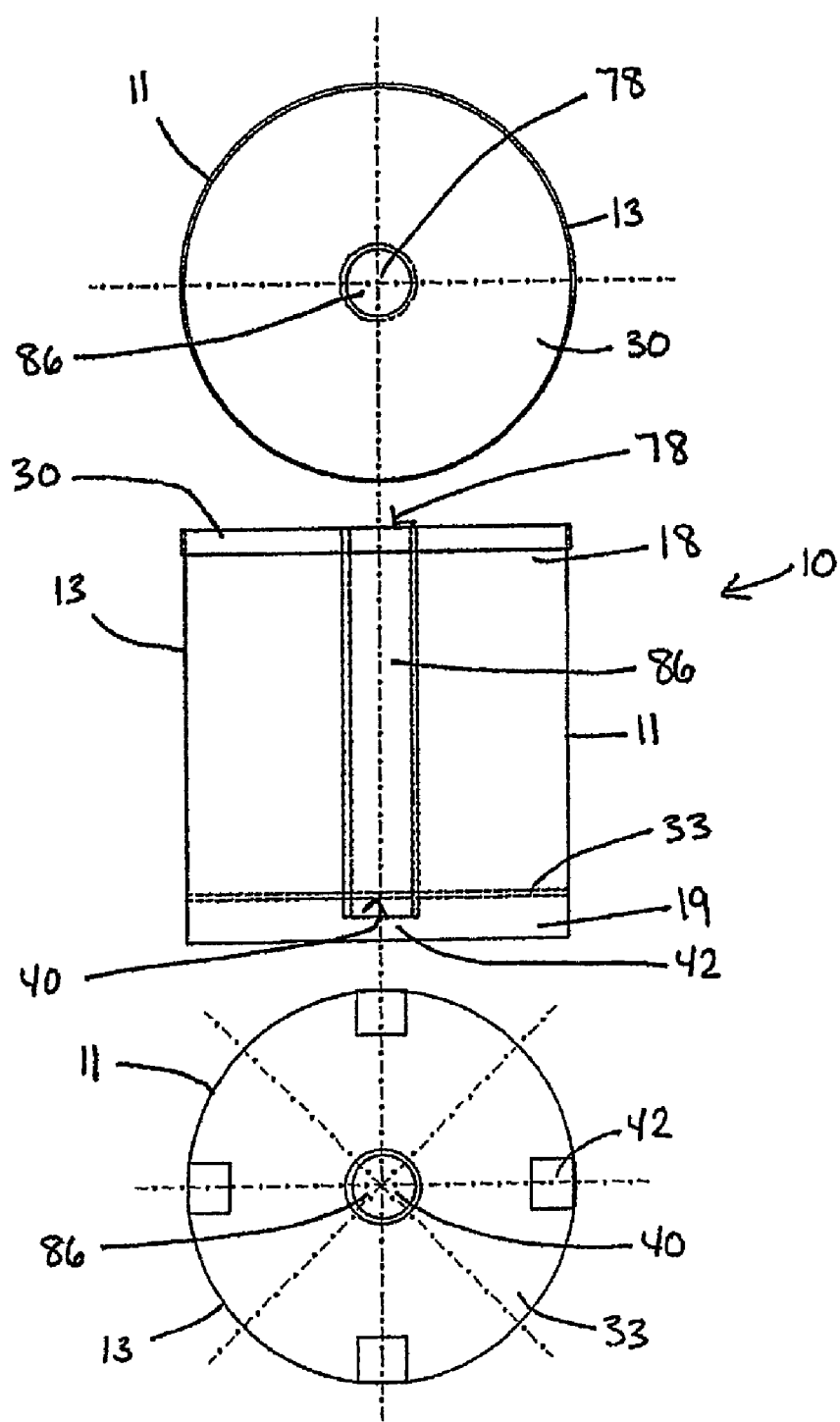
Figure 27:
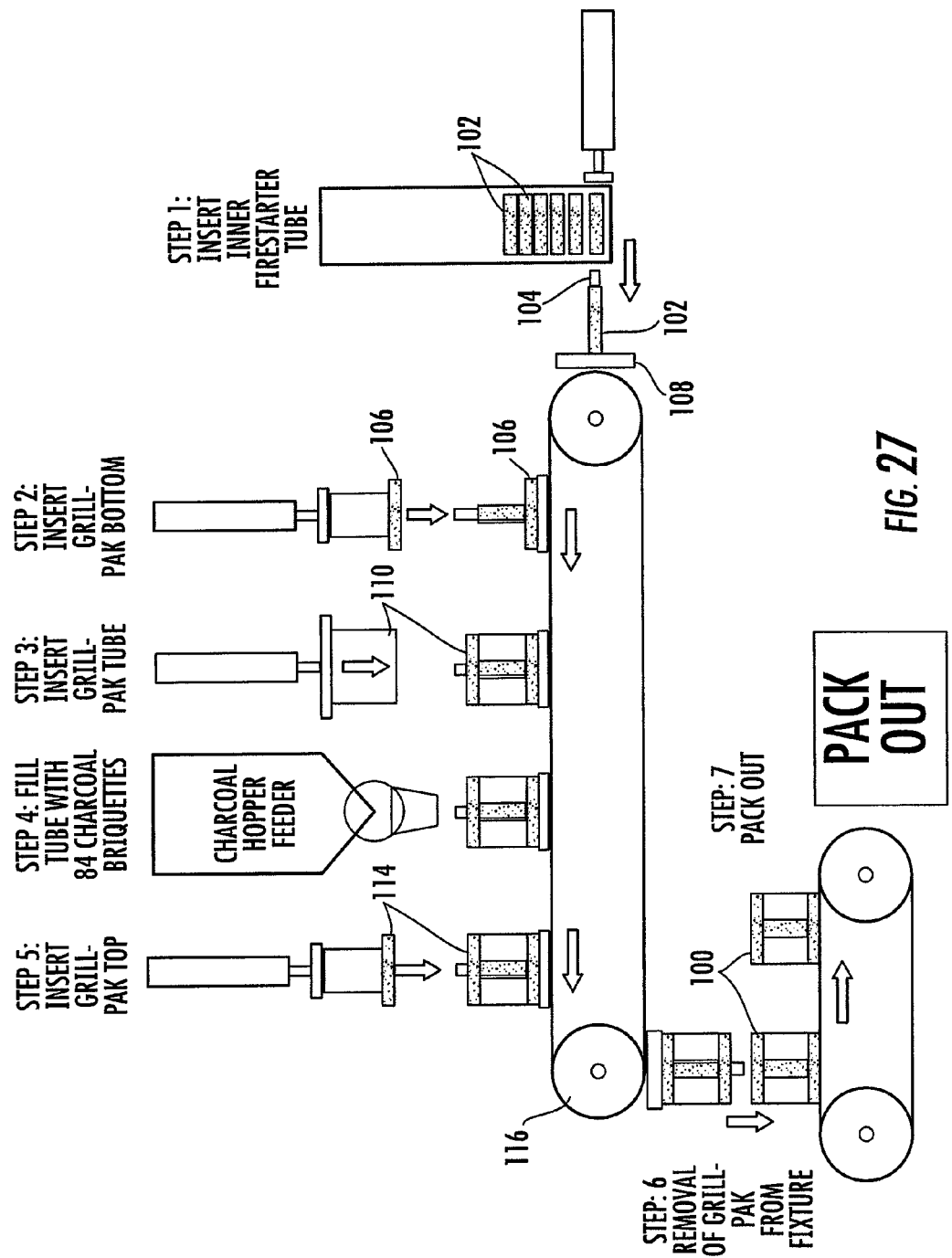
Figure 28A:
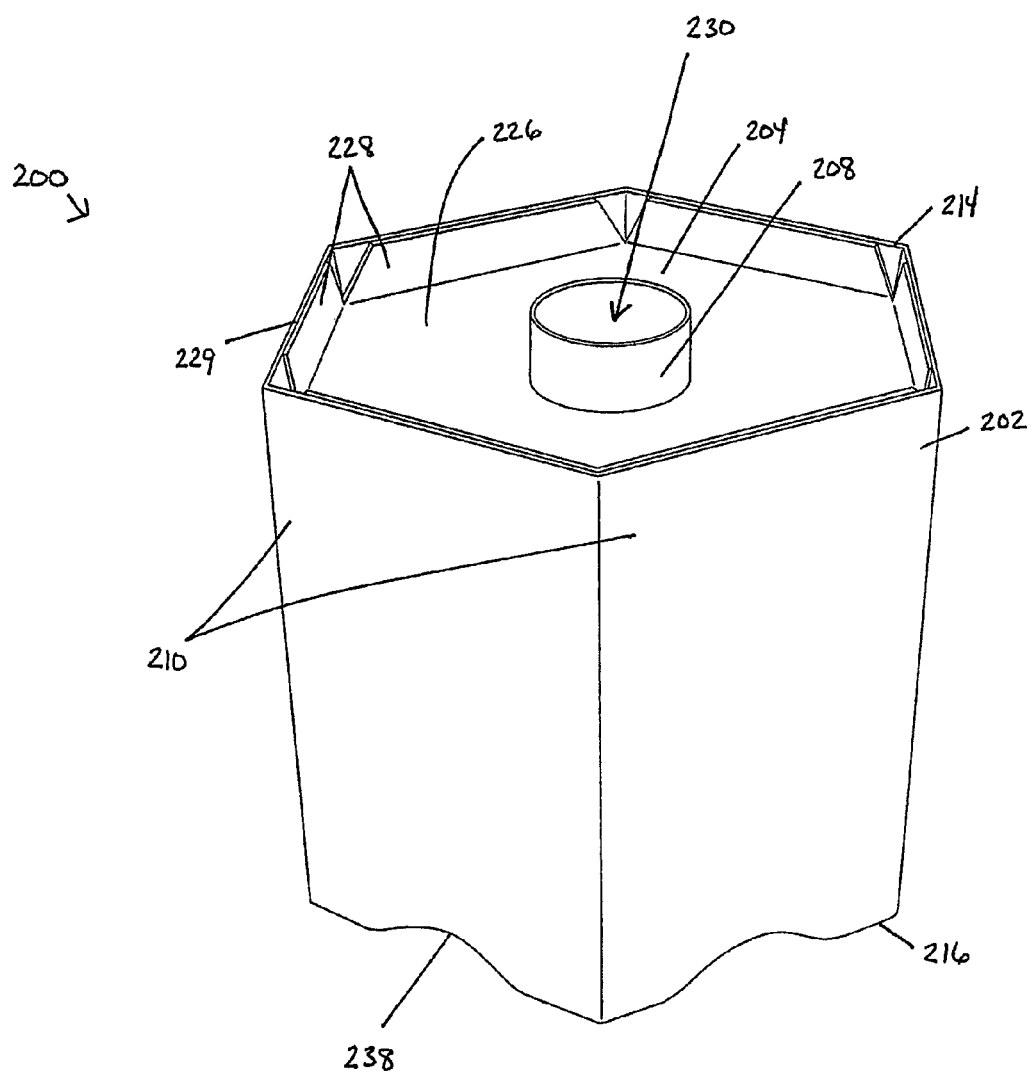
Figure 28B:
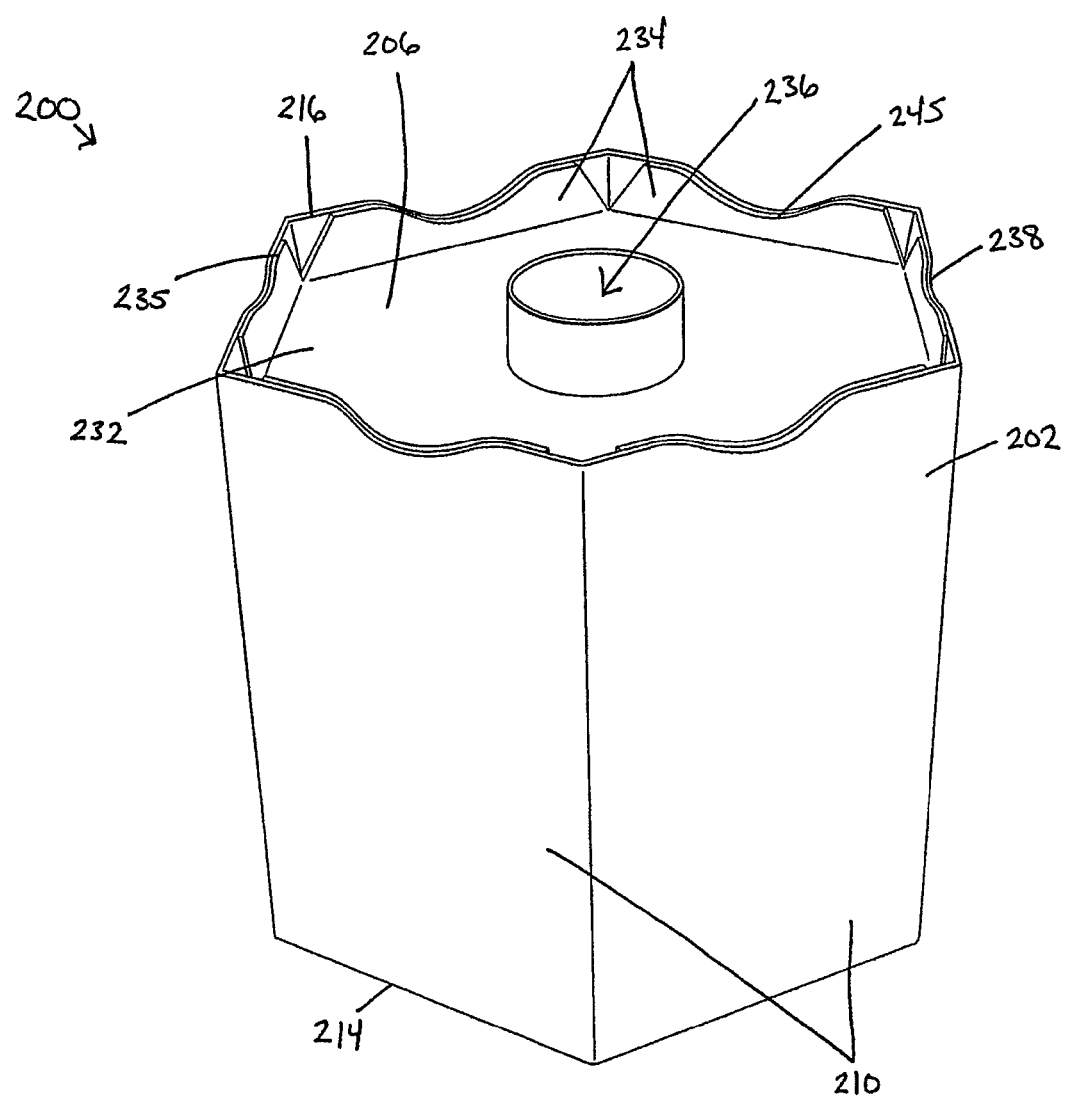
Figure 28C:
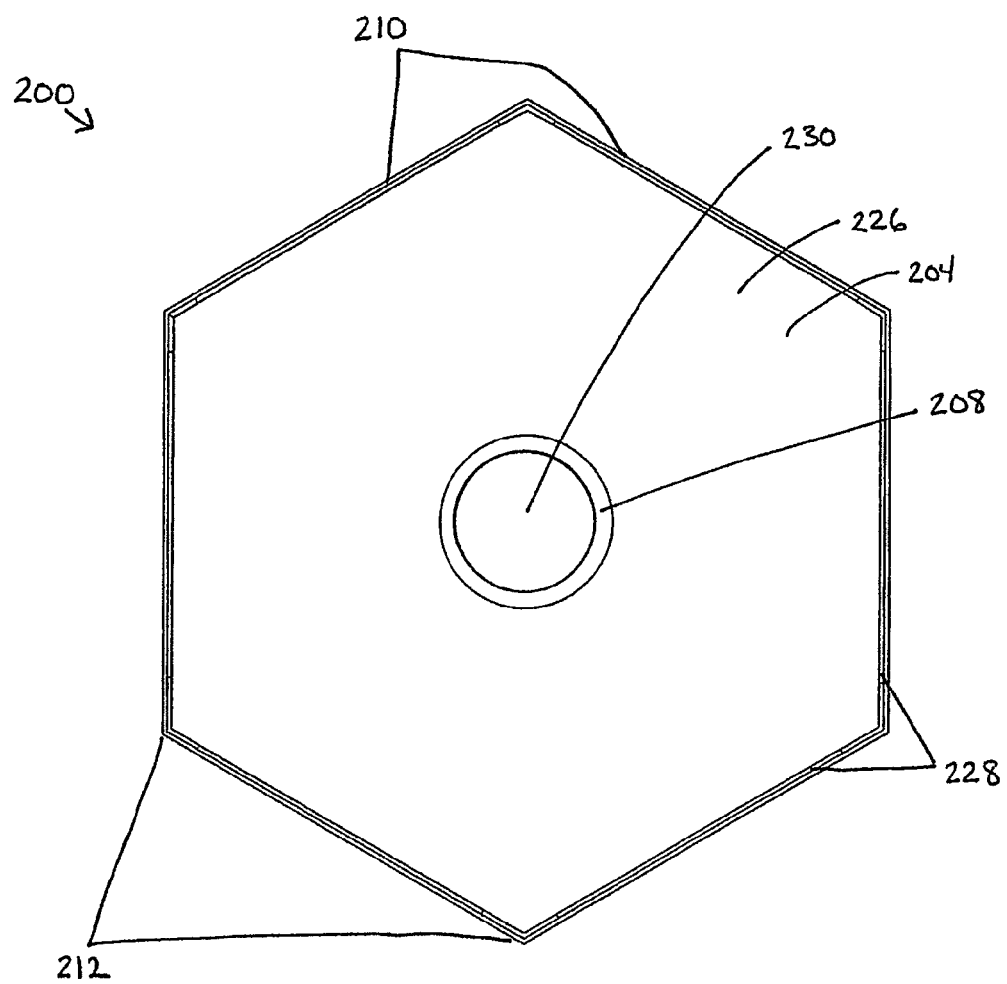
Figure 28D:
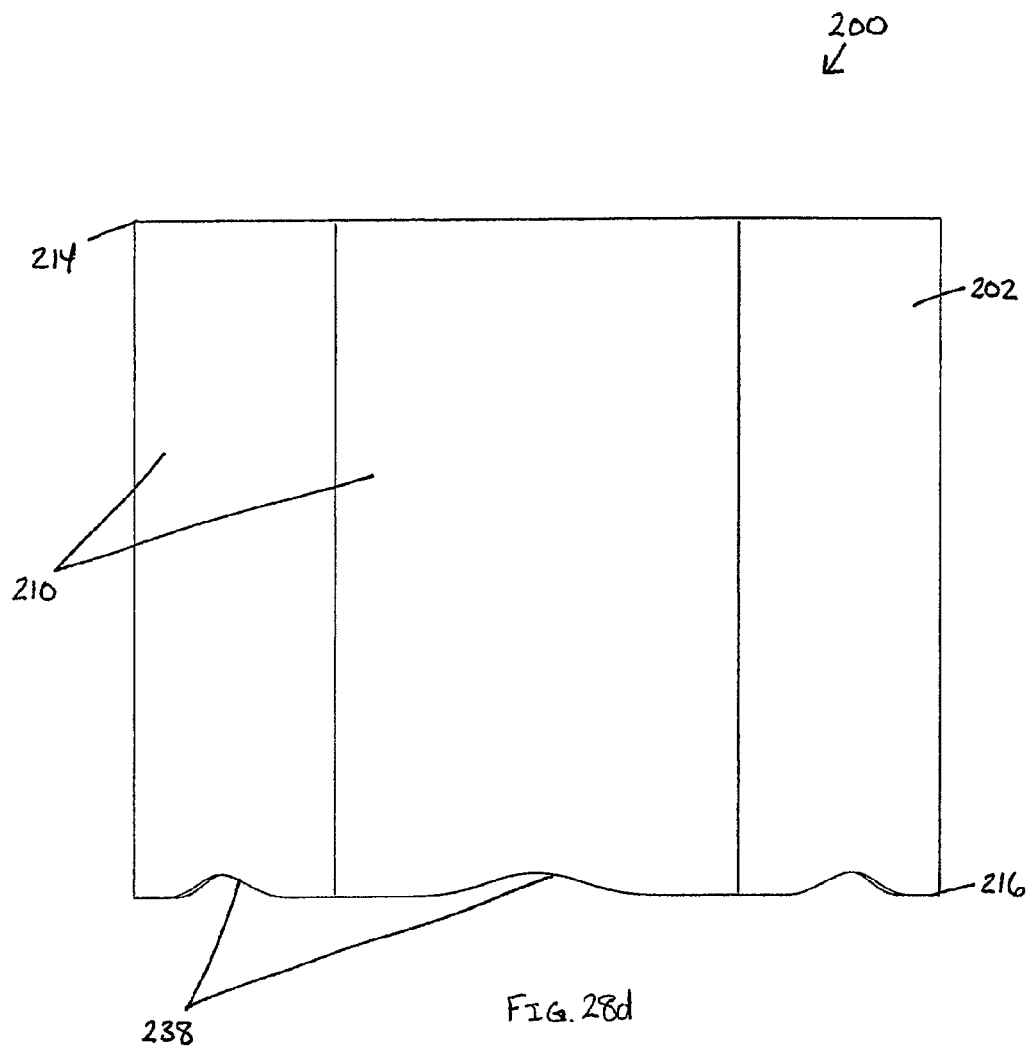
Figure 28E:
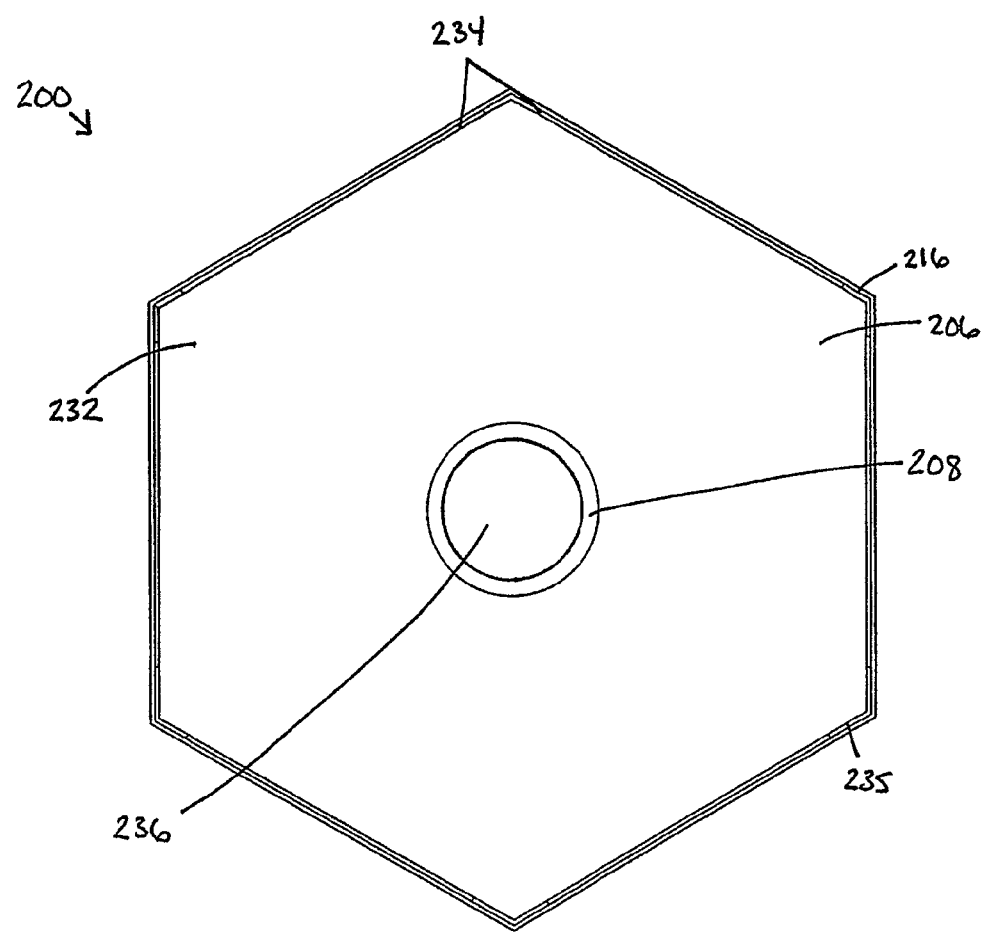
Figure 29:
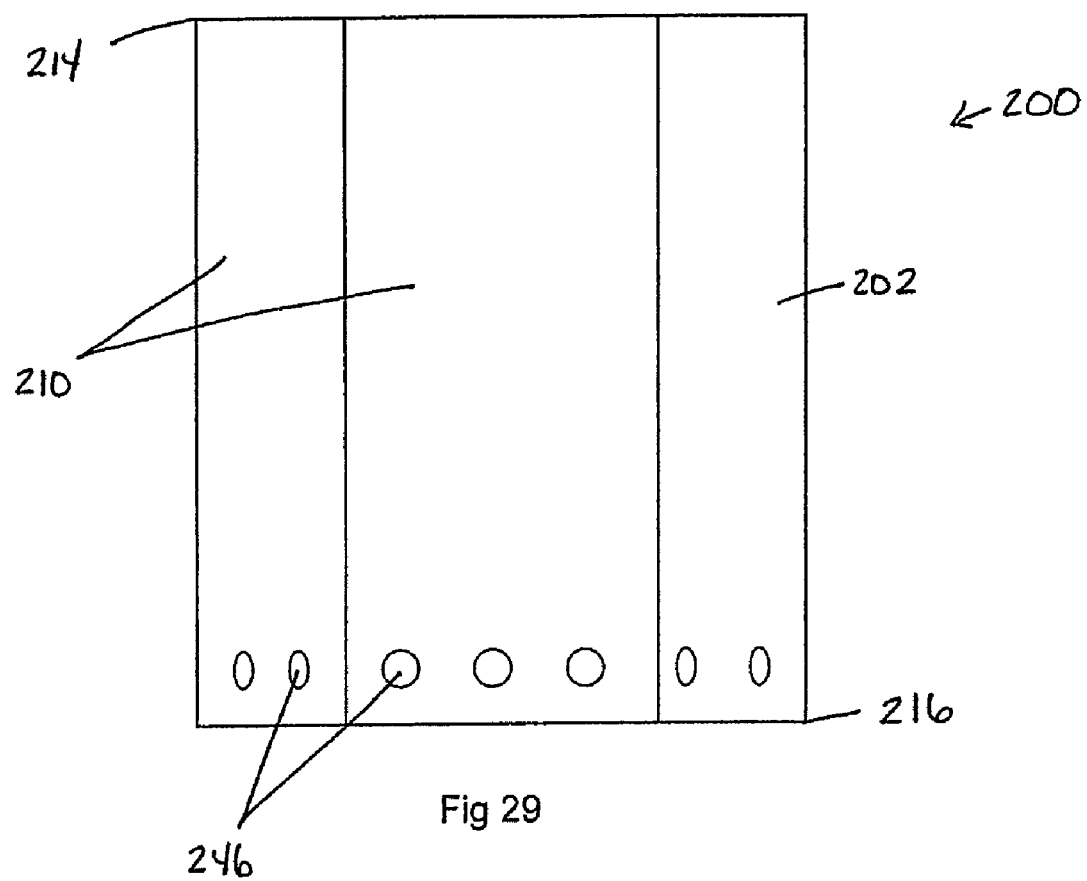

Having thus described the invention in general terms, reference will now be made to the accompanying drawings, which are not necessarily drawn to scale, and wherein:

FIG. 1 is a cross-sectional view of a combustible package in accordance with an embodiment of the present invention wherein the fire starter functions as a bottom lid as well;

FIG. 2 is a cross-sectional view of a combustible package in accordance with another embodiment of the present invention wherein a separate bottom lid is employed;

FIG. 3 is a perspective view of an annular fire starter in accordance with an embodiment of the present invention wherein the fire starter has protuberances;

FIG. 4 is a perspective view of an annular fire starter in accordance with another embodiment of the present invention wherein the fire starter has grooves or channels instead of protuberances;

FIG. 5 is a cross-sectional view of a combustible package in accordance with another embodiment of the present invention;

FIG. 6 is a cross-sectional view of a combustible package in accordance with another embodiment of the present invention;

FIG. 7 is a cross-sectional view of a combustible package in accordance with another embodiment of the present invention;

FIG. 8 is a cross-sectional view of a combustible package in accordance with another embodiment of the present invention;

FIG. 9 is a cross-sectional view of a combustible package in accordance with another embodiment of the present invention;

FIG. 10 is a cross-sectional view of a combustible package in accordance with another embodiment of the present invention;

FIG. 11 is a cross-sectional view of a combustible package in accordance with another embodiment of the present invention;

FIG. 12 is a cross-sectional view of a combustible package in accordance with another embodiment of the present invention;

FIG. 13 is a cross-sectional view of a combustible package in accordance with another embodiment of the present invention;

FIG. 14 is a cross-sectional view of a combustible package in accordance with another embodiment of the present invention;

FIG. 15 is a cross-sectional view of a combustible package in accordance with another embodiment of the present invention;

FIG. 16 is a cross-sectional view of a combustible package in accordance with another embodiment of the present invention;

FIG. 17 is a cross-sectional view of a combustible package in accordance with another embodiment of the present invention;

FIG. 18 is a cross-sectional view of a combustible package in accordance with another embodiment of the present invention;

FIG. 19 is a cross-sectional view of a combustible package in accordance with another embodiment of the present invention;

FIG. 20 is a cross-sectional view of a combustible package in accordance with another embodiment of the present invention;

FIG. 21 is a cross-sectional view of a combustible package in accordance with another embodiment of the present invention;

FIG. 22 is a cross-sectional view of a combustible package in accordance with another embodiment of the present invention;

FIG. 23 is a cross-sectional view of a combustible package in accordance with another embodiment of the present invention;

FIG. 24 is a cross-sectional view of a combustible package in accordance with another embodiment of the present invention;

FIG. 25 is a cross-sectional view of a combustible package in accordance with another embodiment of the present invention;

FIG. 26 is a cross-sectional view of a combustible package in accordance with another embodiment of the present invention;

FIG. 27 is a flow chart of a method according to an embodiment of the present invention;

FIG. 28a is a top perspective view of a combustible package in accordance with an embodiment of the present invention;

FIG. 28b is a bottom perspective view of the combustible package in FIG. 28a FIG. 28c is a top view of the combustible package illustrated in FIG. 28a;

FIG. 28d is a side view of the combustible package illustrated in FIG. 28a;

FIG. 28e is a bottom view of the combustible package illustrated in FIG. 28a;

FIG. 29 is side view of a combustible package in accordance with another embodiment of the present invention;

FIG. 30a is a top view of the top lid of the combustible package of FIG. 28a in an unfolded configuration;

FIG. 30b is a top view of the bottom lid of the combustible package of FIG. 28a in an unfolded configuration;

FIG. 30c is a top view of the wallboard of the combustible package of FIG. 28a in an unfolded configuration;

FIG. 31a is a top view of a bottom lid of a combustible package in an unfolded configuration in accordance with another embodiment of the present invention;

FIG. 31b is a top view of a top lid and a wallboard of a combustible package in an unfolded configuration in accordance with another embodiment of the present invention;

FIG. 32a is a top view of a bottom lid of a combustible package in an unfolded configuration in accordance with another embodiment of the present invention; and FIG. 32b is a top view of a top lid and a wallboard of a combustible package in an unfolded configuration in accordance with another embodiment of the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the present invention provide a combustible package 10 for a fuel source and at least one fire starter. As explained in more detail below, the combustible package 10 may include a wound paper tube 11, charcoal briquettes 20, and one or more fire starters. In some embodiments the combustible package may include at least one of top and bottom lids.

According to the embodiments illustrated in FIGS. 1, 2, and 5 through 27, the wound paper tube 11 comprises a tubular paper wall 13 that defines an interior space 14 with a diameter 15, a length 17, a top end 18, and a bottom end 19. The diameter 15 is generally the same at the top end 18 and the bottom end 19. The tube 111 can have various cross-sectional shapes including round and non-round shapes. Also the tube 11 can be made by any suitable process such as a spiral-winding or a convolute-winding process. In yet another embodiment, the tube may be made from a pulp molding process. In some embodiments, the wound paper tube 11 may further comprise a foil liner (not illustrated) and the tubular paper wall 13 may define one or more ventilation openings.

The interior space 14 is large enough to store a predetermined quantity of charcoal briquettes 20 (the charcoal briquettes are not illustrated in every figure for clarity). The charcoal briquettes 20 are pieces of pillow-shaped compressed black porous material that once ignited will burn over a period of time generating heat. The quantity of charcoal briquettes 20 can vary according to the size of the grill that the combustible package is intended for or the amount of food to be cooked.

It should be understood that in other embodiments of the invention other charcoal shapes or other fuel sources may be used instead of charcoal briquettes 20. For example, the paper tube 11 may hold lumps of charcoal or pieces of wood.

According to the embodiments illustrated in FIGS. 1 and 2, the combustible package 10 includes a top lid 30. The top lid 30 can be made from paper and can have a shape to match the shape of the top end 18 of the paper tube 11. Also the top lid 30 can include a tab 31 to allow for the easy removal of the top lid 30 from the paper tube 11. The top lid 30 can be adhered to the paper tube 11 by an adhesive. The top lid 30 may define one or more ventilation holes. Moreover, the top lid 30 may be configured to stay on the combustible package during the burning of the stored charcoal briquettes 20 or the top lid 30 may be configured to be removed from the combustible package before the burning of the stored charcoal briquettes 20.

In addition to or instead of paper, the top lid 30 may be made from or include one or more other materials such as wood chips, aluminum foil or plastic. Also, the shape of the top lid 30 may vary. For example, the top lid 30 may be square-shape and may extend past the paper tube 11 with four corners that can serve as tabs for easy removal of the top lid 30. Likewise the top lid 30 may be attached to the paper wall 13 in a variety of ways. For example, the top lid 30 may be secured to a top rim 36 defined by the paper wall as shown in FIG. 1 or the top lid 30 may be secured to an inside surface 38 of the paper wall (not illustrated).

The one or more fire starters of embodiments of the present invention may have various shapes and sizes relative to the combustible package. For example and according to the embodiments illustrated in FIGS. 1, 2, and 5 through 7, the combustible package may have one annular shaped fire starter 21. As shown in FIG. 3, the annular fire starter may comprise a body 22, a top face 23, a bottom face 24, four protuberances 25, an inner diameter, an outer diameter, and a side surface 28. The body 22 may be a compressed piece of a mixture of wood shavings and/or paper fiber, and an accelerant, such as a paraffin wax or rosin or soybean wax or other vegetable oil-based wax or mixture thereof, and defines a central hole 29 that extends from the top face 23 to the bottom face 24. The central hole 29 preferably is smaller than the charcoal briquettes 20 so as not to allow any charcoal briquettes 20 to fall through the central hole 29. Alternatively, a paper layer could be adhered to the top face 23 covering the hole 29 to prevent charcoal briquettes and/or charcoal dust from escaping. The top face 23 and bottom face 24 are parallel to each other and extend from the inner diameter to the outer diameter. The four protuberances 25 extend from the bottom face 24 away from the top face 23. The protuberances 25 are located approximately equilaterally from each other along the bottom face 24. According to the embodiment of FIG. 1, the placement and shape of the protuberances 25 may allow for a stable base for the annular fire starter 21 when placed on a flat surface with the protuberances 25 in contact with the flat surface. Moreover, the protuberances 25 allows for air to flow from underneath the annular fire starter 21 and through the central hole 29 to facilitate the burning of the combustible package 10 after the combustible package 10 is ignited.

Alternatively and according to the embodiments illustrated in FIGS. 5 and 6, the protuberances may extend from the top face 23 away from the bottom face 24, or both the top and bottom face may both include protuberances (not illustrated).

As illustrated in FIGS. 2 and 4, the annular fire starter 21 may not have protuberances extending from the bottom face 24 or the top face 23, but instead the bottom face 24 may define a plurality of grooves or channels 32. The channels 32, like the protuberances 25, may help to facilitate air flow through the central hole 29 even when the first fire starter 21 is laid flat on a surface. Alternatively, in other embodiments of the present invention, protuberances and/or channels in the top and bottom faces 23, 24 may be omitted.

According to the embodiment illustrated in FIG. 1, the outer diameter of the annular fire starter 21 may be slightly smaller than the diameter 15 of the interior space 14 in order to allow the annular fire starter 21 to fit into the interior space 14 and be attached to the inside surface of the paper wall 13. Specifically the annular fire starter 21 may be placed in the interior space 14 at the bottom end 19 so that the top face 23 and bottom face 24 are perpendicular to the length 17 of the interior space 14 and the protuberances 25 are projecting away from the top lid 30. As shown in FIG. 1, by occupying the entire bottom end 19 except for the central hole 29, which is smaller than the charcoal briquettes 20, the annular fire starter 21 may function as an effective bottom lid of the package.

In other embodiments of the invention such as the one illustrated in FIG. 2, the annular fire starter 21 may be substantially smaller in diameter than the tube 11 such that a separate bottom lid 33 is needed. The bottom lid 33 may define an upper surface 34 and lower surface 35. The first fire starter 21 can be secured to the upper surface 34. For example, hot melt glues or other adhesive may be used to secure the fire starter to the upper surface 34.

The bottom lid 33 may define one or more holes to facilitate the air flow through the bottom lid 33. For example and according to the embodiment illustrated in FIG. 2, the bottom lid 33 may include a first opening 40 that aligns with the central hole 29 of the annular fire starter. As another example and according to the embodiments illustrated in FIGS. 7, 8, 9, and 11 through 14, the bottom lid 33 may define four air holes 48 in addition to the first opening 40. The four air holes 48 are equidistance to each other and the distance between the four air holes 48 and the first opening 40 may vary. As another example and according to the embodiments illustrated in FIGS. 10, 15, 18, 19, 20, 21, 24 and 25, the bottom lid 33 may define eight air holes 48 in addition to the first opening 40. The eight air holes 48 are equidistance to each other and the distance between the eight holes 48 and the first opening 40 may vary.

The bottom lid 33 may be made from a corrugated or recycled paper or any other material that can adequately support the fire starter or starters and the charcoal briquettes. Also, the bottom lid 33 may be coated or saturated with an accelerant such as a wax or silicate.

The bottom lid may be secured to the paper wall by a press-fit, tabs, staples or other fasteners, and/or an adhesive. For example and according to the embodiment illustrated in FIG. 2, the bottom lid 33 may be attached to a bottom rim 37 defined by the paper wall 13. According to other embodiments, the bottom lid 33 may be secured between or within the paper tube 11. For example and according to the embodiments illustrated in FIGS. 5 through 26, the bottom lid 33 may be supported within the tubular paper wall 13 away from the bottom rim 37 and toward the top rim 36. And the bottom lid 33 may be supported by one or more tabs 42 defined by the paper tube 11. Each tab 42 is a portion of the paper tube 11 that extends from the bottom rim 37 toward the top rim 36 and is bent inwardly to form indents for engaging or supporting the bottom lid 33. The bending of the tabs also provides ventilation openings that may help provide a path for air to flow into the combustible package 10. According to the embodiments illustrated in FIGS. 5 through 26, the paper wall 13 defines four or eight tabs 42 spaced equilaterally around the paper wall 13. In addition to or instead of the tabs 42, the bottom lid 33 may be supported within or to the paper tube 11 by an adhesive, fasteners, or other means or structures.

As mentioned above, the tabs 42 may also provide ventilation openings into the combustible package 10 and the bottom lid 33 may define one or more ventilation openings. Therefore in some embodiments the ventilation openings provided by the tabs 42 along with the opening or openings in the bottom lid 33 may provide a path for air flow from outside the paper tube 11 and through the bottom lid 33 and into the interior space 14 of the combustible package.

Instead of or addition to the ventilation openings provided by the tabs 44, the paper wall 13 may define other ventilation openings. For example, according to the embodiment illustrated in FIG. 6, the paper wall 13 may define four square holes 44 located equilaterally around the paper wall 13 and positioned immediately above the bottom lid 33. As another example and according to the embodiment illustrated in FIG. 15, the paper wall 13 may define eight circular air holes 46 located equilaterally around the paper wall 13 and positioned approximately half way between the top and bottom rims 36, 37.

Instead of or an addition to the first fire starter 21 described above (i.e. the annular fire starter made from a compressed piece of a mixture of wood shavings and/or paper fiber, and an accelerant, such as a paraffin wax or rosin), the combustible package 10 may have one or more additional fire starters. For example and according to the embodiments of FIGS. 8 through 12, the combustible package may have a second fire starter 50 in addition to the first annular fire starter 21. The second fire starter 50 may be a tubular piece of paper such as a paper towel tube, brown wrapper tube, or a rolled corrugated piece of cardboard. Moreover the paper of a second fire starter 50 may also include an impregnation (e.g., a coating or saturation) of an accelerant, such as a paraffin wax or soybean wax or other vegetable oil-based wax or mixture thereof. For example, a second fire starter 46 may be dipped or soaked into the accelerant to form the coating or saturation.

According to the embodiments illustrated in FIGS. 8 through 12, the second fire starter 50 may extend from the first fire starter 21 toward the top end 18 of the combustible package 10. The length or extension of the second fire starter 46 may vary relative to the length of the paper wall 13. For examples, according to the embodiment of FIG. 8, the length of the second fire starter 50 is less than a third of the length of the paper tube 11. According to the embodiment of FIG. 9, the length of the second fire starter 50 is more than two thirds of the length of the paper tube 11. And according to the embodiment of FIG. 11, the second fire starter 50 extends from the first fire starter 21 to approximate the top rim 36 of the paper tube. In general, an increase in the length of the second fire starter 50 may correspond to more of charcoal briquettes 20 being in direct contact or proximate to the second fire starter 46 which may speed the rate at which the combustible package 10 burns.

The tubular structure of the second fire starter 50 defines a central opening 51. The central opening of the second fire starter 46 may be aligned with the central hole 29 of the first fire starter. Also, as illustrated in FIGS. 8 and 10, the tubular paper of the second fire starter 50 may extend into and at least partially through the central hole 29 of the first fire starter and the bottom lid 33.

According to the embodiment illustrated in FIG. 9, the combustible package may have yet another fire starter 53 positioned at least partially within the central hole 29 of the first annular fire starter 21. The additional fire starter 53 may help to ignite the first annular fire starter 21 and/or help connect the first and second fire starters 21, 50.

In yet other embodiments, the combustible package 10 may not have the first annular fire starter 21 that is described above. For example, the combustible package 10 may have one fire starter that extends from the bottom lid 33 toward the top end of the tubular paper wall 11.

As a more specific example and according to the embodiments illustrated in FIGS. 13 and 14, the combustible package 10 may include a fire starter 60 that has a cross-shaped cross-section and extends from the top end 18 of the paper tube to and at least partially into the bottom lid 33. Specifically, a portion of the fire starter 60 may form a press-fit with an opening 40 of the bottom lid 33.

According to the embodiment illustrated in FIG. 15, the combustible package 10 may include a fire starter 62 that has a star-shaped cross-section and extends from the top end 18 of the paper tube to and at least partially into the bottom lid 33. Specifically, a portion of the fire starter 62 may form a press-fit with an opening 40 of the bottom lid 33. The fire starter 62 may be made at least partially from paper and dipped in an accelerant.

According to the embodiment illustrated in FIG. 16, the combustible package 10 may have a fire starter 64 integrated into the bottom lid 65. More specifically, the bottom lid 65 may be a spiral wrapped corrugated piece of cardboard that includes a center portion saturated in an accelerant. The saturated center portion defines the fire starter 64 of the combustible package 10.

According to the embodiment illustrated in FIG. 17, the combustible package 10 may include a plurality of fire starters 68. For example, as shown in FIG. 17, the combustible package 10 has five fire starters 68. Each fire starter 68 is a cardboard tube dipped in an accelerant. At least a portion of each fire starter 68 forms a press fit with an opening defined by the bottom lid 33 and extends upwardly toward the top end 18 of the combustible package. The bottom lid 33 may further define a plurality of air holes 70 proximate each fire starter 68.

According to the embodiments illustrated in FIGS. 18 and 19, the combustible package 10 may include a fire starter 72 that forms a cross-shape and extends substantially across the bottom lid 33. More specifically, the fire starter 72 may comprise of two pieces of cardboard dipped in an accelerant and assembled together to form a cross-shape. The height of the fire starter 72 relative to the rest of the combustible package 10 may vary as shown in FIGS. 18 and 19.

According to the embodiments illustrated in FIGS. 20 and 21, the combustible package 10 may include a fire starter 74 comprising a cylindrical shaped piece of cardboard dipped in an accelerant. The fire starter 74 may extend over a plurality of air holes 48 defined in the bottom lid 33. The height of the fire starter 72 relative to the rest of the combustible package 10 may vary as shown in FIGS. 20 and 21.

According to the embodiment illustrated in FIG. 22, the combustible package 10 may include a fire starter 76 that extends from the top and bottom lids 30, 33. More specifically, a first end of the fire starter 76 may form a press fit with an opening 40 of the bottom lid and a second end of the fire starter 76 may form a press fit with an opening 78 of the top lid. For example and as illustrated in FIG. 22, the fire starter 76 may have a square shaped cross-section that fits at least partially into squared shaped openings 40, 78 of the top and bottom lids 30, 33. The fire starter 76 may comprise a piece of cardboard dipped in an accelerant.

According to the embodiment illustrated in FIG. 23, the combustible package 10 may include a fire starter 80 that extends from the top end 18 of the combustible package to and at least partially into the bottom lid 33. The fire starter 80 may have a general rectangular cross-section that extends substantially across the bottom lid 33. At least a portion of the fire starter 80 may form a press fit with an opening 40 of the bottom lid. The fire starter 80 may comprise a piece of cardboard dipped in an accelerant.

According to the embodiment illustrated in FIG. 24, the combustible package 10 may include a fire starter 82 comprising a wavy shaped piece of cardboard dipped in an accelerant and extends substantially across the bottom lid 33. According to the embodiment illustrated in FIG. 25, the combustible package 10 may include a second fire starter 84 comprising a wavy shaped piece of cardboard dipped in an accelerant and extends substantially across the bottom lid 33. The first and second wavy shaped fire starters 82, 84 may collectively form a cross-shaped fire starter as shown in FIG. 25.

According to the embodiment illustrated in FIG. 26, the combustible package 10 may include a fire starter 86 that extends from the top and bottom lids 30, 33. More specifically, a first end of the fire starter 86 may form a press fit with an opening 40 of the bottom lid and a second end of the fire starter 86 may form a press fit with an opening 78 of the top lid. For example and as illustrated in FIG. 26, the fire starter 86 may comprise a tubular shaped piece of cardboard dipped into a wax that fits at least partially into circular shaped openings of the top and bottom lids 30, 33.

According to the embodiment illustrated in FIG. 27 a method of manufacturing a combustible package 100 is provided. A fire starter 102 may be placed around an insert 104. A bottom lid 106 may be inserted through and around the fire starter 102 and the insert 104 against an insert support 108. A paper tube 110 may be inserted through and around the fire starter 102 and the insert 104 such that at least a bottom end of the paper tube 110 engages the bottom lid 106. Charcoal briquettes or other fuel source (not illustrated for clarity) may be inserted into an interior space provide by the paper tube 110. A top lid 114 may be placed near or against a top end of the paper tube 110 to close off the top end of the paper tube 110. And the combustible package 110 may be removed from the insert 104 and the insert support 108. As illustrated, the combustible package 110 may be moved between operations by a conveyor system.

When the combustible package 10 is placed in a grill in an upright orientation, at least one of the fire starters is ignited with a match or lighter. Once the fire starter is ignited, the fire starter in turn ignites the paper tube and the charcoal briquettes 20. In some embodiments, a fire starter may also ignite additional fire starters of the combustible package. The fire starter(s), the paper tube 11, the bottom lid 33, and the top lid 30, if present, are completely consumed in the fire, leaving the charcoal briquettes 20.

The package 10 of the present invention has several advantages. The wound (or molded) paper tube 11 structure is inexpensive to produce. The paper tube 11 is also easy to make in a variety of sizes allowing for packages ranging in size from ones suitable for a single food portion to ones suitable for very large events requiring numerous food portions. Furthermore the cylindrical shape of the paper tube 11 makes a natural chimney, which is ideal for charcoal preparation. Another advantage of the package 10 is its combustibility. The wound paper tube 11 as well as the top lid 30, the fire starter or starters, and the bottom lid 33 are combustible, leaving only coals and ashes after use. Also, by containing the fire starters within the package 10, the need for an additional package for a fire starter or starters is eliminated. The chimney structure of the tube 11 and the enclosed fire starter or starters allow for the use of unsoaked charcoal briquettes 20 which are safer and burn longer than the required presoaked charcoal briquettes of other packages. Other advantages are retail shelving attractiveness and storage and transport effectiveness provided by the neat and orderly stackability of the package, including allowing for point of purchase displays.

Although the above embodiments generally described a combustible package having a wound (or molded) paper tube 11 as an outer wall, in other embodiments the combustible package may include an outer wall of other shapes and construction than a wound paper tube. For example, the combustible package may include an outer wall of cardboard (e.g., corrugated fiberboard, paperboard) or other fibrous material, referred to herein as a wallboard.

The wallboard may extend around an axis and define the interior space for storing the charcoal briquettes and at least one fire starter. The wallboard may include one or more panels delimited by corners in the wallboard. For example, the wallboard may have three panels and three corners and thus define a triangle-shaped cross section. Or the wallboard may have four panels and four corners and thus define a square-shape cross-section. And other embodiments, the number of panels and corners may be increase such that the wallboard defines varies shapes including hexagonal and octagonal shaped cross-sections. A corner in the wallboard may include a bend in a continuous sheet of material or be formed by two edges of a sheet or sheets of material being joined together at an angle.

FIGS. 28a through 28e illustrates an embodiment of a combustible package 200. The combustible package 200 includes a wallboard 202, a top lid 204, a bottom lid 206, and at least one fire starter 208. In a folded configuration and as best illustrated in FIGS. 28a and 28b, the wallboard 202 includes six panels 210 and six corners 212 and defines a hexagonal-shaped cross-section. The wallboard 202 extends from a top edge 214 to a bottom edge 216 and defines a height or length of the combustible package 200 between the two edges 214, 216. The wallboard 202 may be formed from one or more sheets of cardboard material. For example and as explained further below, the wallboard 202 may be formed from one sheet of a cardboard material, such a corrugated E-flute white colored cardboard media. Two ends 218, 220 of the wallboard may include a tab 222 and a slot 224 (illustrated in FIGS. 30c, 31b, and 32b) for joining the two ends 218, 220. In addition to or instead of the tab and slot, an adhesive or fasteners may be employed to join the two ends 218, 220 and form a wallboard that extends completely around an axis.

Referring back to FIGS. 28a through 28e, the top lid 204 may generally have a hexagonal shape and be configured to fit within the interior space defined by the wallboard 202 at a substantially perpendicular orientation to the height of the combustible package 200. The top lid 204 may be dimensioned such that the top lid 204 may form a press fit with an inner surface of the wallboard 202 to help hold the top lid 204 in place within the wallboard 202. The press fill may provide a seal-like closure to minimize or reduce possible charcoal dust from escaping from the package. In addition to or instead of the press fit, an adhesive or fasteners may be employed to hold the top lid 204 in place within the wallboard 202.

As illustrated in FIG. 28a, the top lid 204 may include a central panel 226 and a number of tabs 228 extending from the central panel 226. The top lid 204 may include fold lines between the central panel 226 and the tabs 228 allow for the bending of the tabs 228 relative to the central panel 226. When positioned within the wallboard 202, the tabs 228 may be bent upwardly (or downwardly) such that the central panel 226 extends perpendicular to the wallboard 202 and the tabs 228 extend along the inner surface of the wallboard 202. The tabs 228 may increase the surface area between the top lid 204 and the wallboard 202 and increase the effectiveness of the press fit between the two 204, 202. According to the embodiment of FIG. 28a, the top lid may be positioned within the wallboard 202 below the top edge 214 of the wallboard such that the tabs 228 extend upwardly and the outer edges 229 of the tabs are substantially flush with the top edge 214 of the wallboard.

The top lid 204 may be made from the same material as the wallboard 202. The central panel 226 of the top lid may define an opening 230 for receiving at least a portion of the fire starter 208.

As illustrated in FIGS. 28b, 28e, and 30b, the bottom lid 206 may generally have a hexagonal shape and be configured to fit within the interior space defined by the wallboard 202 at a substantially perpendicular orientation to the height of the combustible package 200. The bottom lid 206 may be dimensioned such that the bottom lid 206 may form a press fit with an inner surface of the wallboard 202 to help hold the bottom lid 206 in place within the wallboard 202. In addition to or instead of the press fit, an adhesive, or fasteners (e.g., staples) may be employed to hold the bottom lid 206 in place within the wallboard 202.

The bottom lid 206 may include a central panel 232 and a number of tabs 234 extending from the central panel 232. The bottom lid 206 may include fold lines between the central panel 232 and the tabs 234 allow for the bending of the tabs 234 relative to the central panel 232. When positioned within the wallboard 22, the tabs 234 may be bent upwardly (or downwardly) such that the central panel 232 extends perpendicular to the wallboard 202 and the tabs 234 extend along the inner surface of the wallboard 202. The tabs 234 may increase the surface area between the bottom lid 206 and the wallboard 202 and increase the effectiveness of the press fit between the two 206, 202. The bottom lid 206 may be positioned within the wallboard 202 above the bottom edge 216 of the wallboard such that the tabs 234 extend downwardly and the outer edges 235 of the tabs are substantially flush with the bottom edge 216 of the wallboard.

The bottom lid 206 may be made from the same material as the wallboard 202. The central panel 232 of the bottom lid may define an opening 236 for receiving at least a portion of the fire starter 208.

The opening 230 defined in the top lid and the opening 236 defined in the bottom lid may be substantially aligned. For example, each opening 230, 236 may be substantially in the center of each lid 204, 206. The fire starter 208 may extend from and be at least partially supported by each of the openings 230, 236. Again as an example, the fire starter 208 may be a spirally wound paper tube impregnated by an accelerant and extend from a first end to a second end. The first end of the fire starter 208 may be held at least partially within the opening 230 of the top lid and the second end of the fire starter 208 may be held at least partially within the opening 236 of the bottom lid. The ends of the fire starter may be held by a press fit, adhesives, a groove defined in the fire starter and/or one or more fasteners.

The accelerant of the fire starter may vary. For example the accelerant may be a paraffin wax or rosin. The accelerant may also be a non-petroleum based accelerant such as soybean wax or other vegetable oil-based wax or mixture thereof. An example of a mixture of soybean wax and other vegetable oil-based wax is the Soyawax offered by Soyawax of Cedar Rapids, Iowa. The use of a non-petroleum based accelerant may help to satisfy health and safety regulations of some governmental and consumer agencies.

The wallboard may define one or more ventilation openings for helping to supply oxygen to the fire starter during burning operations. For example, according to the embodiment illustrated in FIGS. 28a and 28b, the bottom edge 216 may be scalloped, i.e. the bottom edge 216 may include a number of curved portions 238 that when place on a flat surface form a number of half moon openings between the bottom edge and the surface. The scalloped bottom edge 216 may be formed by creating a number of curved portions 238 along the bottom edge 216 of the wallboard in an unfolded configuration as illustrated in FIG. 30c. As another example and as illustrated in FIG. 32b, the scalloped bottom edge 238 may be formed by creating oval opening 240 along a fold line 242 between the bottom edge 216 and tabs 244 extending from the fold line 242 opposite the bottom edge 216. In a folded configuration (such as shown in FIGS. 28a and 28b), the tabs are extended upwardly along the inner surface of the wallboard and the two halves of the oval opening are folded onto themselves to form the scalloped bottom edge.

The tabs 234 of the bottom lid may also have a scalloped outer edge, i.e., the outer edge 235 may include one or more curved portions 244 as illustrated in FIGS. 30b and 31a. The scalloped outer edge 235 of the tabs 234 of the bottom lid may be aligned with the scalloped bottom edge 216 of the wallboard such that the bottom lid 206 or more specifically the tabs 234 do not substantially interfere with the ventilation openings formed by the scalloped bottom edge 238.

According to another embodiment and as illustrated in FIG. 29, the wallboard 202 may include ventilation holes 246 above the bottom edge 216. The tabs 234 of the bottom lid may include through holes (not illustrated) that can be aligned with the ventilation holes 246 in the wallboard such that the bottom lid 206 or more specifically the tabs 234 do not substantially interfere with the ventilation holes 246 of the wallboard.

FIGS. 30a through 30c illustrates a top lid 204, a bottom lid 206, and a wallboard 202 in unfolded configurations. According to this embodiment each of the top lid 204, the bottom lid 206, and the wallboard 202 are made from a single sheet of material and each may be folded and assembled together to form at least part of a combustible package 200. As explained below, in other embodiments one or more of the top lid 204, the bottom lid 206, and the wallboard 202 may be integrated together from a single sheet of material.

FIG. 31b illustrates a wallboard 202 and a top lid 204 in an unfolded configuration according to an exemplary embodiment. As illustrated the wall board 202 and the top lid 204 may be formed from a single sheet of the material 248. Specifically, an edge 250 of the central panel 226 may extend from a fold line 252 opposite a portion of the top edge 214 of the wallboard. Also as illustrated, the wall board 202 may include a number of tabs 254 extending from a fold line opposite the top edge 214 of the wall board. The tabs 254 may include one or more slots 256. The central panel 226 of the top lid may include a number of tabs 258 extending from the periphery of the central panel 226. In the folded configuration, the tabs 254 extending from the fold line opposite from the top edge 214 may be folded downwardly along the inner surface of the wallboard 202. And the central panel 226 may be folded to a substantially perpendicular orientation from the wallboard and the tabs 258 extending from the periphery of the central panel 226 may fit into the slots 256 of the tabs 254 extending along the inner surface of the wallboard 202 to help support the top lid 204.

FIG. 32b illustrates a wallboard 202 and a top lid 204 in an unfolded configuration according to another exemplary embodiment. As illustrated the wallboard 202 and the top lid 204 may be part of a single sheet of material and include the interlocking tabs 254, 258 and slots 256 for supporting the top lid in the folded configuration as described in the embodiment illustrated in FIG. 31b. According to the embodiment of FIG. 32b, the wallboard 202 may include a number of tabs 244 extending from a fold line opposite the bottom edge 216 of the wallboard. The wallboard may define a number of oval opening 240 along a fold line 242 between the bottom edge 216 and tabs 244, as explained above, for creating a scalloped bottom edge 216. The tabs 244 may include projections 262 extending from an outer edge of the tabs 244.

FIG. 32a illustrates a bottom lid 206 in an unfolded configuration according to an exemplary embodiment. The bottom lid 206 includes the central panel 232 and a number of tabs 234 extending from a fold line opposite the central panel 232. As explained above, the tabs 234 may include the curved portions 244 along the outer edges of the tabs to align with the scalloped bottom edge 216. The bottom lid 206 may also define a number of slots 264 extending along the fold line between the tabs 234 and the central panel 232.

In the folded configuration, the tabs 244 extending from the fold line 242 opposite the bottom edge 216 are folded upwardly along the inner surface of the wallboard 202 and the projections 262 extending from the tabs 244 engage the slots 264 defined in the bottom lid 206 to help support the bottom lid 206.

The fold lines, openings, and edges that define the different features of the top lid, the bottom lid, and the wall board may be formed through a series of cutting and creasing dies, e.g., rotary and flat cutting dies. One in the art would appreciate that the single sheet of material illustrated in FIGS. 30a through 32b may be formed from a larger sheet of material that was processed (e.g., cut, creased, and/or punched) to form multiple wallboards, top lids, and bottom lids for multiple combustible packages.

The outer surface of the wall board may include markings or indicia for marketing, aesthetics, and other purposes. For example, a company logo or other advertisement may be placed on the outer surface. Or as another example, information about the combustible package, such as instructions or a content listing, may be placed on the outer surface. The markings or indicia may be placed onto the outer surface through a labeling processing, i.e. a label may be attached to the outer surface.

According to an exemplary embodiment, the markings are printed onto the outer surface. Due to the multiple bends between the panels in the wallboard, printing the markings onto the outer surface may provide a more aesthetic pleasing combustible package than a combustible package having an attached label. For example, a printed outer surface may have fewer imperfections than an adhered label because portions of a label may become folded, creased, or partially pulled away from the outer surface during the handing and shipping of the combustible package, especially considering the multiple bends in the combustible package.

As illustrated in the embodiments of FIGS. 28a and 32b, the fuel source, such as charcoal briquettes, may be stored within the combustible package between the outer wall, the top and bottom lids, and the fire starter, collectively defining a storage area of the combustible package. In these embodiments, the storage area may be substantially free of any opening, such as ventilation holes, and thus any debris or dust created by the fuel source may be substantially self-contained within the combustible package during shipping and handling.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A combustible package for containing a fuel source and a fire starter, said package comprising:
   an outer wall extending from a top edge defining a top opening to a bottom edge defining a bottom opening;
   a top lid for substantially closing the top opening, wherein the top lid defines a first central opening extending through the top lid;
   a bottom lid for substantially closing the bottom opening, wherein the bottom lid defines a second central opening extending through the bottom lid; and the fire starter extending from a first end to a second end, wherein the first end is held at least partially within the first central opening in the top lid and the second end is held at least partially within the second central opening in the bottom lid;

wherein the outer wall, the top lid, the bottom lid, and the fire starter are combustible.

2. The combustible package according to claim 1 including the fuel source being contained between the outer wall, the top lid, the bottom lid, and the fire starter.

3. The combustible package according to claim 1, wherein the fire starter comprises a spirally wound paper tube impregnated with an accelerant.

4. The combustible package according to claim 3, wherein the accelerant comprises a paraffin wax.

5. The combustible package according to claim 3, wherein the accelerant comprises a vegetable oil-based wax.

6. The combustible package according to claim 1, wherein the outer wall comprises a cardboard.

7. The combustible package according to claim 6, wherein the outer wall includes an outer surface having printed indicia.

8. The combustible package according to claim 7, wherein the outer wall defines a hexagonal-shaped cross-section.

9. The combustible package according to claim 1, wherein the outer wall comprises a spirally wound paper tube.

10. The combustible package according to claim 1, wherein the outer wall defines one or more ventilation openings between the bottom edge and the bottom lid.

11. The combustible package according to claim 1, the bottom edge of the outer wall being scalloped for providing ventilation openings.

12. The combustible package according to claim 11, wherein the bottom lid includes a central panel configured to extend across the bottom opening and a plurality of tabs configured to extend along an inner surface of the outer wall, and wherein each of the plurality of tabs include a scalloped outer edge for aligning with the scalloped bottom edge of the outer wall.

13. The combustible package according to claim 12, wherein the top lid includes a central panel configured to extend across the top opening and a plurality of tabs configured to extend along an inner surface of the outer wall and facilitate a press fit between the top lid and the outer wall.

14. A combustible package for containing a fuel source and a fire starter, said package comprising:
an outer wall of cardboard extending from a top edge defining a top opening to a bottom edge defining a bottom opening;
a top lid for substantially closing the top opening, wherein the top lid includes a central panel configured to extend across the top opening and a plurality of tabs configured to extend along an inner surface of the outer wall and facilitate a press fit between the top lid and the outer wall, wherein the central panel of the top lid defines a first central opening extending through the top lid;
a bottom lid for substantially closing the bottom opening, wherein the bottom lid includes a central panel configured to extend across the bottom opening and a plurality of tabs configured to extend along the inner surface of the outer wall and facilitate a press fit between the bottom lid and the outer wall, wherein the central panel of the bottom lid defines a second central opening extending through the bottom lid;
wherein the first central opening in the top lid and the second central opening in the bottom lid are substantially aligned along a longitudinal axis of the combustible package and wherein the outer wall, the top lid, and the bottom lid are combustible; and
a fire starter extending from a first end to a second end, wherein the first end is held at least partially within the first central opening in the top lid and the second end is held at least partially within the second central opening in the bottom lid.

15. The combustible package according to claim 14, wherein the outer wall includes an outer surface having printed indicia.

16. The combustible package according to claim 14, wherein the outer wall includes a plurality of panels defining a hexagonal shape.

17. The combustible package according to claim 14, wherein the outer wall defines one or more ventilation openings between the bottom edge and the bottom lid.

18. The combustible package according to claim 14, the bottom edge of the outer wall being scalloped for providing ventilation openings.

19. The combustible package according to claim 18, wherein each of the plurality of tabs of the bottom lid include a scalloped outer edge for aligning with the scalloped bottom edge of the outer wall.

20. The combustible package according to claim 14, wherein the fire starter comprises a spirally wound paper tube impregnated with an accelerant.

21. The combustible package according to claim 14, including the fuel source being contained between the outer wall, the top lid, the bottom lid, and the fire starter.

22. The combustible package according to claim 21, wherein the fuel source comprises a plurality of charcoal briquettes.

23. A combustible package comprising:
an outer wall of cardboard extending from a top edge defining a top opening to a bottom edge defining a bottom opening;
a top lid for substantially closing the top opening, wherein the top lid includes a central panel for extending across the top opening and a plurality of tabs configured to extend along an inner surface of the outer wall and facilitate a press fit between the top lid and the outer wall, wherein the central panel of the top lid defines a first central opening extending through the top lid; and
a bottom lid for substantially closing the bottom opening, wherein the bottom lid includes a central panel for extending across the bottom opening and a plurality of tabs configured to extend along the inner surface of the outer wall and facilitate a press fit between the bottom lid and the outer wall, wherein the central panel of the bottom lid defines a second central opening extending through the bottom lid;
a fire starter extending from a first end to a second end, wherein the first end is held at least partially within the first central opening in the top lid and the second end is held at least partially within the second central opening in the bottom lid, wherein the fire starter comprises a spirally wound paper tube impregnated with an accelerant; and
a plurality of charcoal briquettes contained between the outer wall, the top lid, the bottom lid, and the fire starter;
wherein the outer wall, the top lid, the bottom lid, and the fire starter are combustible.

24. The combustible package according to claim 23, wherein the outer wall comprises a spirally wound paper tube.

25. The combustible package according to claim 23, wherein the fire starter comprising a pulp based material.

26. The combustible package according to claim 25, wherein the pulp based material is impregnated with an accelerant.

27. The combustible package according to claim 23, wherein the bottom closure defines one or more ventilation openings.

* * * * *

UNITED STATES PATENT AND TRADEMARK OFFICE
CERTIFICATE OF CORRECTION

Page 1 of 1

PATENT NO. : 7,789,919 B2
APPLICATION NO. : 11/686150
DATED : September 7, 2010
INVENTOR(S) : Helms, Jr. et al.

It is certified that error appears in the above-identified patent and that said Letters Patent is hereby corrected as shown below:

Column 5,

Line 30, "The tube 111 can have" should read --The tube 11 can have--.

Signed and Sealed this
Twentieth Day of December, 2011

David J. Kappos
*Director of the United States Patent and Trademark Office*